(12) United States Patent
Kato

(10) Patent No.: US 9,115,787 B2
(45) Date of Patent: Aug. 25, 2015

(54) CHAIN GUIDE AND CHAIN TENSIONER DEVICE

(75) Inventor: Akio Kato, Iwata (JP)

(73) Assignee: NTN Corporation, Osaka (JP)

( * ) Notice: Subject to any disclaimer, the term of this patent is extended or adjusted under 35 U.S.C. 154(b) by 136 days.

(21) Appl. No.: 13/147,709

(22) PCT Filed: Jan. 29, 2010

(86) PCT No.: PCT/JP2010/051246
§ 371 (c)(1),
(2), (4) Date: Aug. 3, 2011

(87) PCT Pub. No.: WO2010/090139
PCT Pub. Date: Aug. 12, 2010

(65) Prior Publication Data
US 2011/0294612 A1    Dec. 1, 2011

(30) Foreign Application Priority Data

Feb. 3, 2009 (JP) ................. 2009-022401
Aug. 27, 2009 (JP) ................. 2009-196655
Sep. 9, 2009 (JP) ................. 2009-208252

(51) Int. Cl.
  *F16H 7/12*     (2006.01)
  *F16H 7/10*     (2006.01)
  *F16H 7/08*     (2006.01)

(52) U.S. Cl.
  CPC .......... *F16H 7/08* (2013.01); *F16H 2007/0865* (2013.01); *F16H 2007/0893* (2013.01)

(58) Field of Classification Search
  CPC .......... F16H 2007/0874; F16H 7/1281; F16H 2007/081; F16H 7/1254; F16H 2007/0806
  USPC .................. 474/111, 133, 134, 135
  See application file for complete search history.

(56) References Cited

U.S. PATENT DOCUMENTS 1,338,293 A * 4/1920 Fuchs ........................... 474/134
1,579,245 A * 4/1926 Pennington ................... 305/134

(Continued)

FOREIGN PATENT DOCUMENTS

| EP | 1 312 830 | 5/2003 |
| JP | 64-8510 | 1/1989 |

(Continued)

OTHER PUBLICATIONS

Supplementary European Search Report issued Jan. 23, 2013 in corresponding European Application No. EP 10 73 8473.

(Continued)

*Primary Examiner* — Henry Liu
(74) *Attorney, Agent, or Firm* — Wenderoth, Lind & Ponack, L.L.P.

(57) ABSTRACT

Disclosed is a lightweight and inexpensive chain guide that has little mechanical loss. The chain guide comprises: a plurality of rollers (2) which make contact with a chain; a chain guide base (10) which supports the plurality of the rollers (2) disposed along a direction of travel of the chain, and a plurality of shafts (3) attached to the chain guide base (10) at predetermined intervals along the direction of travel of the chain. Each of the rollers (2) includes a rolling-element bearing portion constituted of a cylindrical outer ring main body (20) encompassing an outer circumferential face of the shaft (3), and a plurality of rolling elements (21) disposed between the outer circumferential face of the shaft and an inner circumferential face of the outer ring main body (20). The outer ring main body (20) is supported on the chain guide base (10) via the shaft (3) so as to be in rolling contact with the chain.

26 Claims, 23 Drawing Sheets

(56) References Cited

U.S. PATENT DOCUMENTS

| | | | | |
|---|---|---|---|---|
| 2,892,206 | A * | 6/1959 | Deibel | 15/250.25 |
| 3,586,142 | A * | 6/1971 | Inwood et al. | 193/35 R |
| 4,068,535 | A * | 1/1978 | Sheets | 474/132 |
| 4,078,642 | A * | 3/1978 | Payne | 193/37 |
| 4,213,523 | A * | 7/1980 | Frost et al. | 193/37 |
| 4,723,516 | A * | 2/1988 | Slagley et al. | 123/90.16 |
| 5,441,354 | A * | 8/1995 | Broder et al. | 400/636.3 |
| 5,441,458 | A * | 8/1995 | Rogus | 474/189 |
| 6,062,998 | A * | 5/2000 | Kumakura et al. | 474/111 |
| 6,189,639 | B1 * | 2/2001 | Fuse et al. | 180/231 |
| 6,196,375 | B1 * | 3/2001 | Cozza | 198/836.1 |
| 6,346,057 | B1 * | 2/2002 | Edelmann | 474/135 |
| 2003/0092521 | A1 * | 5/2003 | Konno | 474/111 |
| 2004/0002401 | A1 * | 1/2004 | Iverson | 474/134 |
| 2006/0240923 | A1 | 10/2006 | Yokoyama | |

FOREIGN PATENT DOCUMENTS

| | | |
|---|---|---|
| JP | 4-3150 | 1/1992 |
| JP | 5-86024 | 11/1993 |
| JP | 7-52694 | 2/1995 |
| JP | 7-208120 | 8/1995 |
| JP | 9-236157 | 9/1997 |
| JP | 10-281244 | 10/1998 |
| JP | 11-20770 | 1/1999 |
| JP | 11-44349 | 2/1999 |
| JP | 2000-81038 | 3/2000 |
| JP | 2000-88450 | 3/2000 |
| JP | 2001-187948 | 7/2001 |
| JP | 2001-317430 | 11/2001 |
| JP | 2002-177170 | 6/2002 |
| JP | 2004-125139 | 4/2004 |
| JP | 2004-348537 | 12/2004 |
| JP | 2008-39033 | 2/2008 |

OTHER PUBLICATIONS

Japanese Notification of Reason(s) for Refusal issued May 8, 2012 in corresponding Japanese Application No. 2009-022401.

Japanese Office Action issued Mar. 19, 2013 in corresponding Japanese Patent Application No. 2009-196655.

International Search Report issued May 18, 2010 in International (PCT) Application No. PCT/JP2010/051246.

Chinese Office Action issued Aug. 16, 2013 in corresponding Chinese Application No. 201080006456.9.

International Preliminary Report on Patentability issued Aug. 18, 2011 in International (PCT) Application No. PCT/JP2010/051246.

* cited by examiner

CHAIN GUIDE AND CHAIN TENSIONER DEVICE

TECHNICAL FIELD

The present invention relates to a chain guide and a chain tensioner device, for pressing a chain looped around a plurality of rotating bodies for power transmission to thereby apply tension to the chain.

BACKGROUND ART

A chain tensioner device applies tension to a drive chain moving at a high speed by pressing a chain guide against some intermediate point of the drive chain looped around drive and driven sprockets, in a direction substantially perpendicular to a direction of travel of the chain. Referring to FIG. 33, the constitution of a valve operating system of an engine will be described below.

FIG. 33 shows a front view of the constitution of a valve operating system in an engine. As illustrated in FIG. 33, a cylinder head 103 is provided on top of a cylinder block 102 of an engine 101.

A crankshaft 105 is rotatably provided in the cylinder block 102, and a crankshaft sprocket 106 is fixed to the end of the crankshaft 105. The cylinder head 103 is provided with an idle sprocket 107. A timing chain 140 is looped around the idle sprocket 107 and the crankshaft sprocket 106.

A small sprocket 109 is coaxially provided for the idle sprocket 107. A cam chain 112 is looped around this sprocket 109 and camshaft sprockets 111, 111 fixed to two, left and right camshafts 110, 110 of the cylinder head 103.

In this constitution, the crankshaft 105 drives the left and right camshaft sprockets 111, 111 and the camshafts 110, 110 in the cylinder head 103 by means of the crankshaft sprocket 106, the timing chain 140, the idle sprocket 107 and the cam chain 112.

It is noted that in FIG. 33, the timing chain 140 rotates clockwise.

A given tension is always applied to the timing chain 140 by a chain guide 120 and a chain tensioner 114 for the timing chain 140. In addition, the timing chain 140 is hampered from swinging by means of a guide 117 provided on a side of the timing chain 140.

The chain guide 120 for the timing chain 140 is of a curved shape, where the sliding surface at the convex curved side is pressed against the timing chain 140 by the chain tensioner 114 being activated by hydraulic pressure, thereby preventing the timing chain 140 from loosening.

The chain guide 120 for the timing chain 140 sustains a considerably large pressing force, which forces the timing chain 140 to rotate against sliding resistance stemming from friction between the timing chain 140 and the chain guide 120.

At that time, the sliding resistance generated by the friction between the chain guide and the drive chain disadvantageously increases noise and mechanical loss.

As an approach to reduce such noise and mechanical loss, the technique disclosed in Patent Literature 1 is known. A chain tensioner device as described in Patent Literature 1 is provided for a valve operating system of an engine to apply tension to a timing chain. The device has rollers disposed on the sliding surface contacting with a timing chain in a curved chain guide, and the rollers are rolling-pressed against the timing chain moving in its longitudinal direction at a high speed to reduce sliding resistance.

However, the aforementioned chain tensioner device as disclosed in Patent Literature 1 still involves the following drawback. That is, because the rollers are mounted on the chain guide by way of sliding bearings, revolution of the rollers entails sliding friction. Moreover, because the rollers disposed on the chain guide press the timing chain with a large pressing force, sliding friction between the rollers and the chain guide increases, which still causes mechanical loss.

In the above-mentioned chain tensioner device as described in Patent Literature 1, the rollers are secured on the chain guide by inserting screws through the sides of the chain guide and fastening the screws with nuts.

Such a conventional chain tensioner device thus utilizes a plurality of components, such as screws and nuts, to fasten the rollers to the chain guide, which presents a drawback that an increased number of components and cost are required as well as assembling efficiency is lowered.

There is another drawback that although strength and weight reduction are requisites for automotive parts, an increase in the number of components is inconsistent with the weight reduction.

CITATION LIST

Patent Literature

Patent Literature 1: Japanese Patent Application Laid-Open No. 9-236157

SUMMARY OF INVENTION

Technical Problem

An objective of the prevent invention is to provide a chain guide capable of further reducing mechanical loss, and a chain tensioner device using the chain guide.

Another objective of the present invention is to provide a lightweight and inexpensive chain guide with high assembling efficiency by decreasing the number of components, and a chain tensioner device employing the chain guide.

A still another objective of the present invention is to provide a lightweight and inexpensive chain guide with high strength.

Solution to Problem

A chain guide according to this invention comprises: a plurality of rollers which make contact with a chain; a chain guide base which supports the plurality of the rollers disposed along direction of travel of the chain; and a plurality of shafts attached to the chain guide base at predetermined intervals along the direction of travel of the chain, wherein each of the rollers includes a rolling-element bearing portion constituted of a cylindrical outer ring main body encompassing an outer circumferential face of the shaft, and a plurality of rolling elements disposed between the outer circumferential face of the shaft and an inner circumferential face of the outer ring main body, and the outer ring main body is supported on the chain guide base via the shaft so as to be in rolling contact with the chain.

According to this invention, the chain guide is capable of pressing the chain moving at a high speed via the rolling-element bearing. Therefore, sliding friction does not take place between the outer ring main body and the shaft supporting the outer ring, so that mechanical loss can be reduced to an extremely low level as compared with existing chain guides. It should be noted that the shaft recited in the claims also covers a shaft with an inner ring of a rolling-element bearing attached to its outer circumference. Furthermore, the chain recited in the claims also covers an endless transmission member other than a chain, e.g., an endless band, including a belt.

The present invention is not limited to a single embodiment. The outer rings may not protrude from the chain guide base. Alternatively, the chain guide base comprises members of a pair of side plates formed in a curved shape so as to be along the direction of travel of the chain, and a part, which makes rolling contact with the drive chain, of an outer circumference of the outer ring main body may protrude from between the members of the pair of the side plates toward the chain. According to this embodiment, the outer circumference, which makes rolling contact with the chain, of the outer ring main body protrudes from between the members of the pair of the side plates toward the chain, whereby the chain is inhibited from abutting the side plate members in the chain guide base. Therefore, it is possible to prevent the chain guide base from wearing away to thereby increase longevity.

Here, the shafts are preferably disposed along an edge portion, which faces the chain, of the chain guide base. According to this embodiment, it is possible to allow the part in rolling contact with the chain in the outer circumference of the outer ring main body to protrude from between the side plate members, without the need to increase an outer diameter of the outer ring main body.

The outer ring main body may be a single member, or alternatively, it may comprise a metallic cylindrical body and an annular member coaxially mounted on an outer circumference of the metallic cylindrical body. According to this embodiment, the outer ring main body comprises the metallic cylindrical body and the annular member coaxially mounted on the outer circumference of the metallic cylindrical body, so that abutment between the metallic drive chain and the metallic cylindrical body can be avoided, which achieves suppression of vibration and noise reduction.

Preferably, the annular member has a pair of flanges protruding in a direction of an outer diameter at its both ends of an axial direction, and the annular member makes rolling contact with the drive chain inside the pair of the flanges. According to this embodiment, the chain is prevented from leaving the outer ring.

Preferably, a protrusion height of the flanges is smaller than a height of a cross section of the chain. According to this embodiment, when the chain moves in rolling contact with the outer ring, outer edges of the flanges do not protrude over the chain, which results in saving space and weight reduction in the chain guide.

Preferably, the annular member is made of resin. According to this invention, because the metallic drive chain makes rolling contact with the resin-made annular member, vibration and noise can be further restrained.

Preferably, the outer ring has a plurality of recesses on its outer circumferential face. Specific examples of the recesses include dimples and grooves. According to this embodiment, the dimples or the grooves retain lubricating oil, thereby improving lubrication performance.

Furthermore, the chain guide according to this invention comprises: the plurality of the rollers which make contact with the chain; the chain guide base which supports the plurality of the rollers disposed along direction of travel of the chain; and the plurality of the shafts attached to the chain guide base at predetermined intervals along the direction of travel of the chain, wherein the chain guide base comprises the members of the pair of the side plates formed in a curved shape so as to be along the direction of travel of the chain, an opposing wall surface of each of the side plates includes support-shaft receiving recesses for receiving the shafts of the rollers, each of the recesses having an opening portion at an edge of a side, which faces the chain, of each of the side plates, and the shafts are inserted into the recesses of the side plates.

According to this invention, the opposing wall surface of each of the side plates is provided with the support-shaft receiving recesses for receiving the shafts of the rollers, in which each of the recesses has the opening portion at the edge of the chain facing side of the side plate. The shafts attached to the rollers are brought to the opening portions to be dropped therein and inserted into the recesses, thereby supporting the rollers on the side plates.

Preferably, the recess is constituted of a circular arc-shaped portion, which is in form of a partly cut-away circle and engaged with the shaft, and an insert portion connecting the opening portion to the circular arc-shaped portion in the side plate. It is preferable to form at least the circular arc-shaped portion of the recess so as not to penetrate the side plate. Such a configuration serves to restrict movement of the inserted shaft in the axial direction.

Moreover, the chain guide base preferably comprises the pair of the side plates, and pillar members for connecting the side plates, where the pair of the side plates and the pillar members are integrally molded with resin. The pair of the side plates and the pillar members thus integrally molded with resin serve to achieve weight reduction in the chain guide base.

Preferably, a cage is provided for holding the rolling elements. Provision of the cage serves to prevent skew of the rolling elements as well as hinder the end faces of the rolling elements from making direct contact with the side plates to thereby hamper the wearing away of the side plates.

Furthermore, a diameter of the circular arc-shaped portion is preferably made smaller than a diameter of the shaft, so that the shaft is press-fitted into the circular arc-shaped portion to be fixed therein. The diameter of the circular arc-shaped portion thus made smaller than that of the shaft forces the shaft to be press-fitted into the circular arc-shaped portion to be fixed therein, which results in restraining rotation of the shaft.

Preferably, a width of an inlet portion where the insert portion of the recess connects with the circular arc-shaped portion is set smaller than the diameter of the circular arc-shaped portion. With this configuration, the inlet portion where the insert portion of the recess connects with the circular arc-shaped portion serves to hinder the shaft from coming off.

Lubrication holes are preferably provided for the side plates and the shaft, respectively, in a manner to penetrate the side plates and the shaft to thereby lubricate the bearing portion from outer surfaces of the side plates. The lubrication holes thus provided serve to supply lubricating oil inside the bearing.

Preferably, a lubricating oil supply portion of the lubrication holes for supplying lubricating oil to the bearing portion is provided at an opposite position from a side, which makes contact with the chain, of the bearing portion. Positioning the lubricating oil supply portion of the lubrication hole in this manner facilitates smooth supply of lubricating oil inside the bearing.

Lubrication grooves are preferably provided on side surfaces of the annular member. The lubrication grooves thus provided ensures good lubrication condition between the side plates of the chain guide base and the annular member, conducive to reducing frictional resistance and improving wear resistance.

Washers are preferably interposed between the roller and the respective side plates. The washers thus interposed between the roller and the side plates are conducive to improving wear resistance of the roller and the side plates.

The chain guide according to this invention comprises: the chain guide base so formed as to be along direction of travel of the chain; and the rollers rotatably supported on the chain guide base and making contact with the chain, wherein a contact surface, which makes contact with the chain, of each of the rollers is formed of a resin member, and molecular orientation of resin of the contact surface follows a moving direction the chain.

According to this invention, the molecular orientation of resin of the contact surface in contact with the chain thus follows the moving direction of the chain. Accordingly, the chain moves along the molecular orientation of resin, whereby wear resistance of resin is enhanced as well as mechanical strength is increased.

Preferably, the roller includes the metallic cylindrical body and the resin-made annular member coaxially mounted on the outer circumference of the cylindrical body, wherein molecular orientation of resin on surfaces, which face the chain guide base, of the annular member follows a sliding direction. The molecular orientation of the surfaces facing the chain guide base thus follows the sliding direction, which contributes to enhancing wear resistance against the chain guide base.

A width of the chain guide base on its free end side may be made larger than a width on its base end side. In the above configuration, a width of a resin-made contact portion may be made larger on the free end side of the chain guide base than on the base end side.

Furthermore, a chain tensioner device according to this invention comprises the swingably supported chain guide as set forth above, and a chain tensioner for pressing the chain guide against the drive chain.

Advantageous Effects of Invention

The chain guide according to this invention includes the plurality of the rolling elements disposed between the outer circumferential face of the shaft and the inner circumferential face of the outer ring main body, so that the chain guide is capable of pressing the moving drive chain via the rolling-element bearing. Accordingly, sliding friction does not take place between the chain tensioner device and the drive chain, whereby mechanical loss can be reduced to an extremely low level as compared with existing chain tensioner devices. Adopting the present invention for a valve operating system of an engine is conducive to improving the fuel consumption rate.

Moreover, the chain guide is integrally molded with resin, which ensures considerable weight reduction as compared with a chain guide made of metal.

Figure 1:
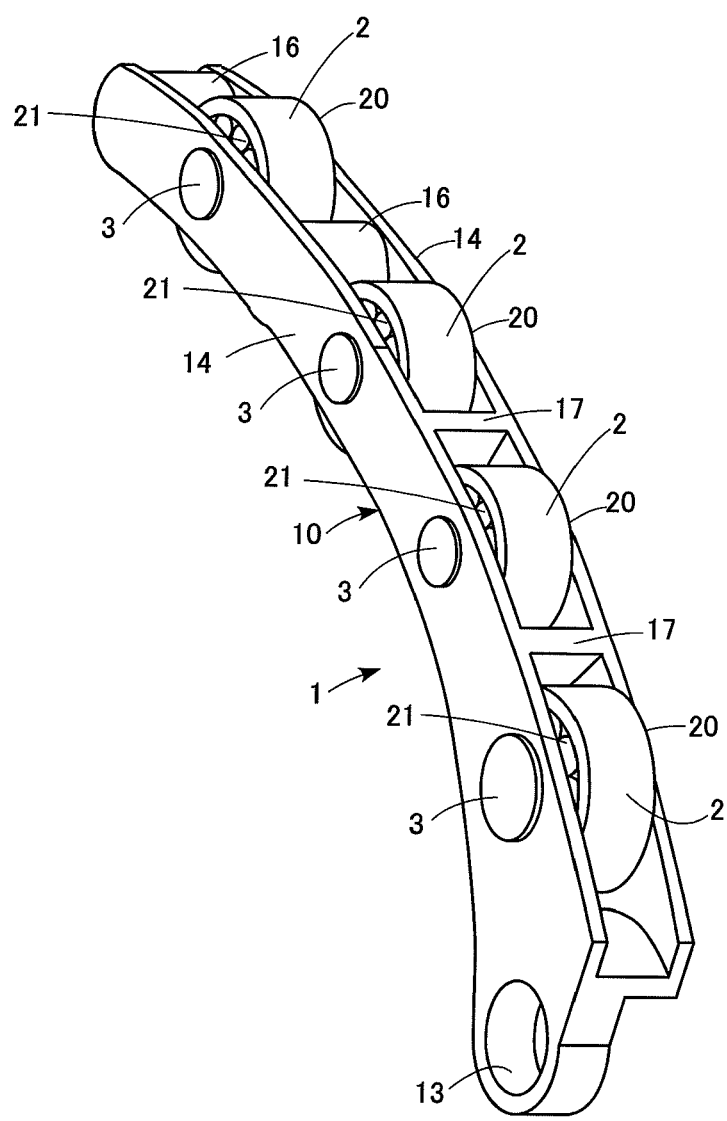
FIG. 1 illustrates a perspective view of the chain guide according to the first embodiment of this invention.

REFERENCE SIGNS LIST 1 chain guide
2 roller
3 shaft
10 chain guide base
10a side plate
11 recess
11a circular arc-shaped portion
11b opening portion
14 side plate
20 outer ring main body
21 rolling element
22 cage
23 annular member
24 flange
40 timing chain

DESCRIPTION OF EMBODIMENTS

Referring now to the drawings, the embodiments of the present invention will hereinafter be described in detail. Through the drawings of the embodiments, the same or similar elements are identified with the same reference numerals and will not be further explained.

Figure 2:
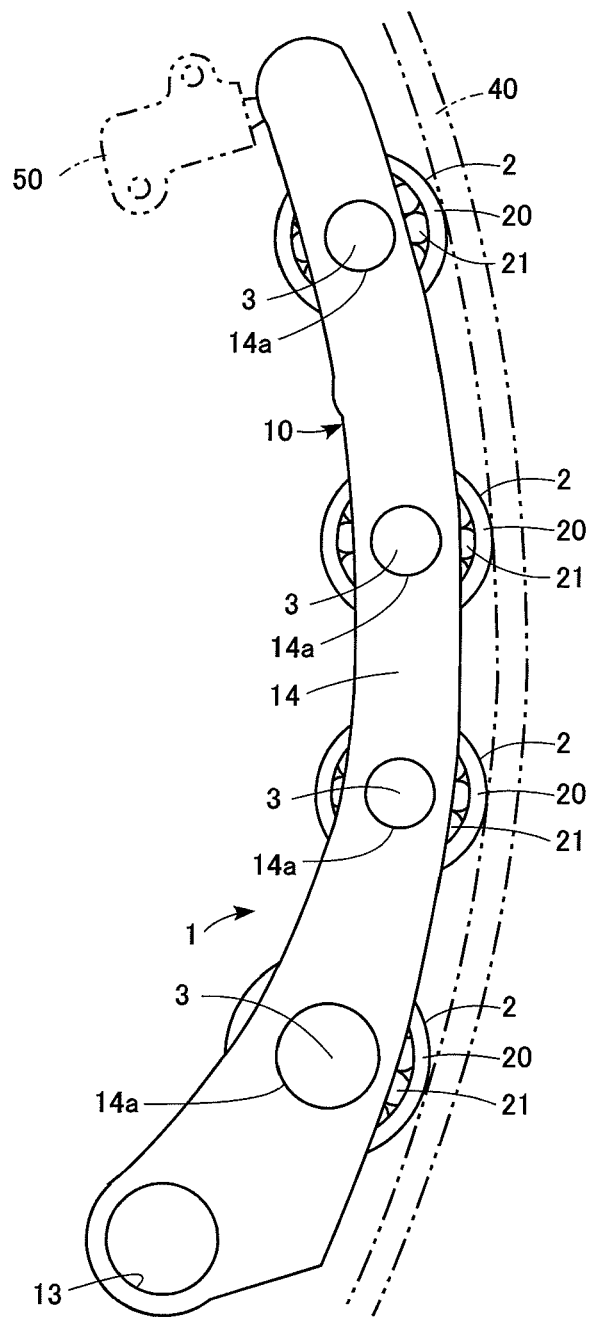
FIG. 2 illustrates a side view of the chain guide according to the first embodiment of this invention, where the chain guide is viewed from the outside in its width direction.
Figure 3:
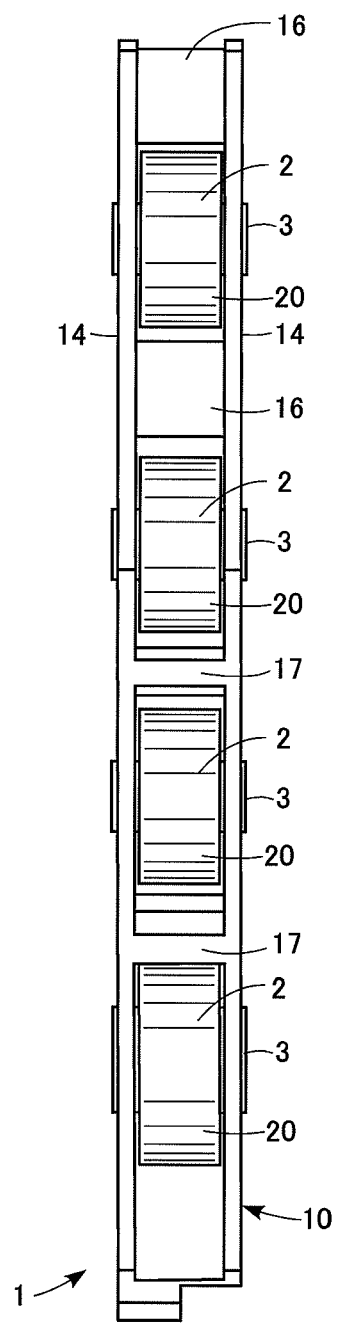
FIG. 3 illustrates a front view of the chain guide according to the first embodiment of this invention, where the chain guide is viewed from the outside curve.
Figure 4:
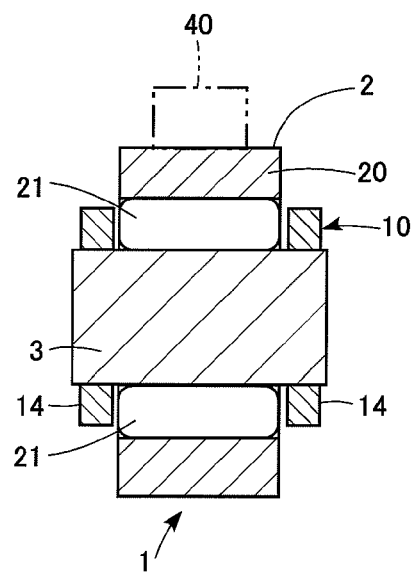
FIG. 4 illustrates a cross-sectional view of the chain guide according to the first embodiment of this invention.

The chain guides according to the embodiments of the present invention apply tension, for example, to a timing chain utilized in a valve operating system of an engine. Initially, the first embodiment of this invention will be described referring to FIGS. 1 to 4. FIG. 1 shows a perspective view of the chain guide according to the first embodiment. FIG. 2 illustrates a side view of the chain guide according to this embodiment, where the chain guide is viewed from the outside in the width direction thereof. FIG. 3 is a front view of the chain guide according to this embodiment, which is viewed from the outside curve, i.e., viewed from a timing chain. FIG. 4 is a cross-sectional view of the chain guide according to this embodiment.

The chain guide 1 used for a valve operating system of an engine is strongly pressed against a timing chain 40 in a direction substantially perpendicular to a travel direction of the timing chain 40. At that time, in order to reduce mechanical loss between the chain guide 1 and the timing chain 40, the first embodiment employs the chain guide 1 having rollers 2 disposed on a part, which abuts the timing chain 40, of the chain guide 1.

The chain guide 1 is formed in a curved shape so as to be along the direction of travel of the chain as shown in FIGS. 1 and 2. The convex curved side (the outside) of the chain guide 1 is disposed along the timing chain 40 shown in virtual lines in FIG. 2.

A chain guide base 10 is of a curved shape and has a through hole 13 at one end of the longitudinal direction thereof. The chain guide 10 is mounted for example to an inner wall of an engine cover by an axle (not shown) inserted through the through hole 13.

The chain guide 1 is free to swing toward the timing chain 40 at the other end of the longitudinal direction thereof, using the through hole 13 as a base end.

A chain tensioner 50 is disposed on this free end side of the chain guide 1. By way of one example, the chain tensioner 50 has a plunger reciprocating in the direction of swing of the chain guide 1 and is attached to the inner wall of the engine cover. The tip of the plunger abuts the inside curve edge 14 of the chain guide 1 to bias the chain guide 1 toward the timing chain 40. Needless to say, the chain tensioner 50 may be one comprising an adjuster mechanism capable of adjusting a pressing force on the chain guide 1 and be of hydraulic type capable of controlling the pressing force on the chain guide 1. The chain tensioner 50 and the chain guide 1 constitute a chain tensioner device. It is noted that the chain guide is also referred to as a chain lever in the chain tensioner device.

The chain guide base 10 includes a pair of side plates 14, 14 disposed in a spaced relationship with each other in the width direction of the chain guide 1. The side plates 14 are formed so as to extend along the timing chain 40 in the longitudinal direction of the chain guide base.

A plurality of shafts 3 are mounted between the pair of the side plates 14, 14. The both ends of the shaft 3 are fitted into shaft apertures 14a provided in the respective side plates 14, 14 to be fixedly secured. The shaft 3 may be formed integrally with one of the side plates 14. In addition, pillar members 16, 17 for connecting the pair of the side plates 14, 14 are provided between the respective adjoining shafts 3, 3.

The pillar members 17 are plate-like members arranged at one side of the longitudinal direction of the chain guide base 10, while the pillar members 16 are column-like members disposed at the other side of the longitudinal direction of the chain guide base 10. The chain guide base 10 including the side plates 14 and the pillar members 16, 17 is made of metal and may preferably be made of light metal. A plurality of the rollers 2 are supported between the side plates 14, 14 of the chain guide base 10 by the shafts 3.

Each of the shafts 3 penetrates a cylindrical outer ring main body 20 constituting the roller 2. Therefore, the outer ring main body 20 encompasses the outer circumferential face of the shaft 3. A plurality of rolling elements 21 are disposed between the outer circumferential face of the shaft 3 and the inner circumferential face of the outer ring main body 20. The rolling elements 21 roll along the outer circumferential face of the shaft 3 and the inner circumferential face of the outer ring main body 20. The shaft 3, the outer ring main body 20 and the rolling elements 21 constitute a rolling-element bearing. Furthermore, as described later, there may be provided a cage for holding the plurality of the rolling elements 21 at predetermined intervals in the circumferential direction.

Here, the entirety of each of the outer ring main bodies 20 is not completely accommodated between the side plates, 14, 14, but the outer circumference of the outer ring main body 20 protrudes from between the side plates 14, 14. Therefore, when the outer ring main bodies 20 protruding from the outside curve edge of the chain guide base 10 abut the timing chain 40, the chain guide base 10 is positioned spaced apart from the timing chain 40.

For this purpose, the shafts 3 are disposed closer to the outside curve edge, which faces the timing chain 40, of the chain guide base 10. In this first embodiment, however, in a case where the thickness between the inside curve edge and the outside curve edge of the chain guide base 10 is smaller than the outer diameter of the outer ring main body 20, the shafts 3 can be approximately centered between the inside curve edge and the outside curve edge.

It is noted that the rolling element 21 may partly protrude from the side plates 14, or be accommodated in its entirety within the side plates 14, so that the side plates 14 restrict movement of the rolling element 21 in the axial direction.

Figure 5:
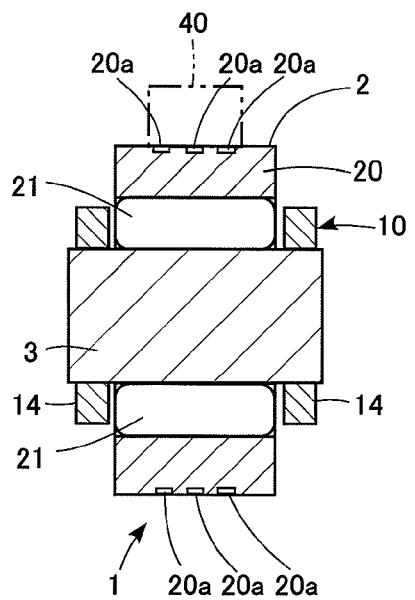
FIG. 5 illustrates a cross-sectional view of the chain guide according to a modification of the first embodiment of this invention.

FIG. 5 shows a modification of the first embodiment. FIG. 5 is a cross-sectional view illustrating the modification of the first embodiment. As shown in FIG. 5, the outer ring main body 20 has a plurality of recesses 20a composed of dimples, grooves or the like on its outer circumferential face. The dimple may be a minute spherical concavity. The groove may be an axially or circumferentially extending groove. Because the recesses 20a retain lubricating oil, when the timing chain 40 is in rolling contact with the outer circumferential face of the outer ring main body 20, an oil film is allowed to intervene between them, which improves lubrication performance.

Next, description will be made of the operation of the chain guide 1 according to the first embodiment of the present invention.

As shown in FIG. 2, when the timing chain 40 moves at a high speed from bottom to upward direction in the diagram to transmit a driving force, the inside curve edge of the chain guide base 10 receives a pressing force from the chain tensioner 50 disposed at this inside curve. Then, the chain guide 1 abuts the timing chain 40 with the through hole 13 provided at one end of its longitudinal direction as a support point and the other end of the longitudinal direction as a free end, so that the timing chain 40 is placed along the outside curve edge of the chain guide 1. The outer circumferential face of the outer ring main body 20 presses a lateral side of the timing chain 40 by making rolling contact therewith. As a result, tension is applied to the timing chain 40. With an increase in the moving speed of the timing chain 40, the rotating speed of the outer ring main body 20 also increases. According to this first embodiment, the shaft 3, the outer ring main body 20 and the rolling elements 21 constitute a rolling-element bearing. Therefore, even in a case of the timing chain 40 moving at a high speed, tension can be applied to the timing chain 40 with less rolling resistance than in conventional chain guides. Moreover, even if a larger pressing force is exerted on the timing chain 40 from the outer ring main body 20, rolling resistance is small.

In this manner, the chain guide 1 can press the timing chain 40 moving at a high speed by using the rollers 2 supported via the rolling-element bearings. Accordingly, sliding friction does not take place between the chain guide 1 and the timing chain 40, so that mechanical loss can be reduced to an extremely low level as compared with the existing chain guides.

Furthermore, according to the aforementioned embodiment, a part, which makes rolling contact with the timing chain 40, of the outer circumference of the outer ring main body 20 protrudes from between the pair of the side plates 14, 14 toward the timing chain 40, so that the timing chain 40 is inhibited from abutting the side plates 14 of the chain guide base 10. Therefore, it is possible to prevent the chain guide base 10 from wearing away to thereby increase longevity. The chain guide base 10 made of light metal, including aluminum, may especially be useful.

Here, the shafts 3 are disposed along the outside curve edge portion confronting the timing chain 40 in the chain guide base 10. Accordingly, it is possible to allow the part in rolling contact with the timing chain 40 in the outer circumference of the outer ring main body 20 to protrude from the side plates 14 toward the timing chain 40, with a reduced outer diameter of the outer ring main body 20.

Figure 6:
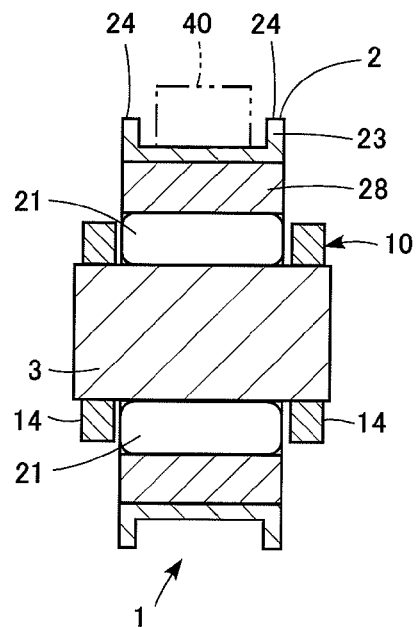
FIG. 6 illustrates a cross-sectional view of the chain guide according to the second embodiment of this invention.

Next, the second embodiment according to the present invention will be described. FIG. 6 is a cross-sectional view illustrating the second embodiment of this invention. In this embodiment, elements that are common with the elements in the aforementioned first embodiment will be identified with the same reference numerals and their explanations will be omitted, while the discussion will focus on the differences.

As shown in FIG. 6, in the second embodiment, an annular member 23 is fixed by press-fitting to the outer circumferential face of an outer ring main body 28. In other words, the outer ring comprises the metallic, cylindrical outer ring main body 28 and the annular member 23 coaxially attached to the outer circumference of the outer ring main body 28. The annular member 23 is made of resin, and has a pair of flanges 24, 24 which are arranged in the direction of the shaft 3 and protrude in the outer diametrical direction. As shown in FIG. 6, the timing chain 40 abuts the outer circumferential face of the annular member 23 inside the flanges 24, 24. The protrusion height of the flange 24 is smaller than the height of the cross section of the timing chain 40.

As described above, according to the second embodiment, the outer ring includes the metallic, cylindrical outer ring main body 28 and the resin-made annular member 23 coaxially attached to the outer circumference of the outer ring main body 28. Therefore, abutment between metallic components, i.e., between the metallic timing chain 40 and the metallic outer ring main body 28, can be avoided, which achieves suppression of vibration and noise reduction.

Moreover, according to the second embodiment, the annular member 23 includes the pair of the flanges 24 protruding in the outer diametrical direction at the both ends of the axial direction. Because the timing chain 40 makes rolling contact with the annular member 23 inside the pair of the flanges 24, 24, the timing chain 40 is prevented from leaving the outer ring of the rolling-element bearing.

According to the second embodiment, the height of the flange 24 is smaller than the height of the cross section of the timing chain 40. Therefore, weight reduction in the outer ring of the rolling-element bearing is attained, leading to the lightweight, space-saving chain guide 1.

In addition, according to this second embodiment, the annular member 23 is made of resin. Therefore, it is possible to further restrain vibration and noise to be generated when the metallic timing chain 40 makes rolling contact with the annular member 23. It is noted that the annular member 23 may be made of elastic rubber.

Figure 7:
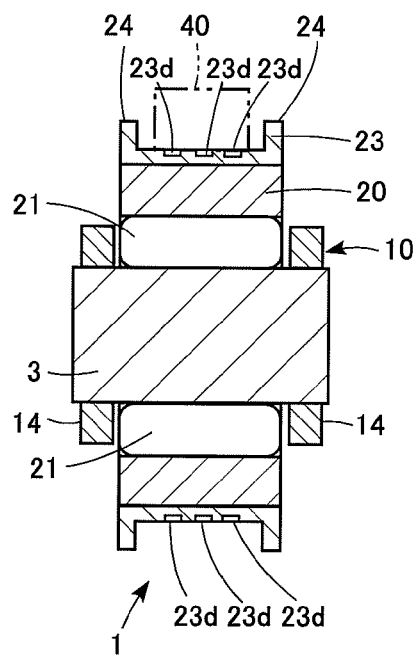
FIG. 7 illustrates a cross-sectional view of the chain guide according to a modification of the second embodiment of this invention.

FIG. 7 shows a modification of the second embodiment. FIG. 7 is a cross-sectional view illustrating the modification of the second embodiment. As shown in FIG. 7, the annular member 23 has a plurality of recesses 23d composed of dimples, grooves or the like on its outer circumferential face inside the flanges 24. The dimple may be a minute spherical concavity. The groove may be an axially or circumferentially extending groove.

Because the recesses 23d formed on the outer circumferential face of the annular member 23 retain lubricating oil, when the timing chain 40 is in rolling contact with the outer circumferential face of the annular member 23, an oil film is allowed to intervene between them, which improves lubrication performance.

Figure 8:
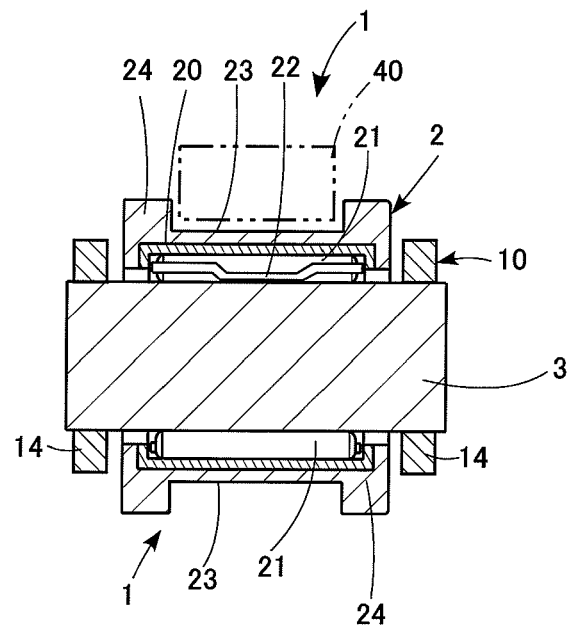
FIG. 8 illustrates a cross-sectional view of the chain guide according to the third embodiment of this invention.
Figure 9:
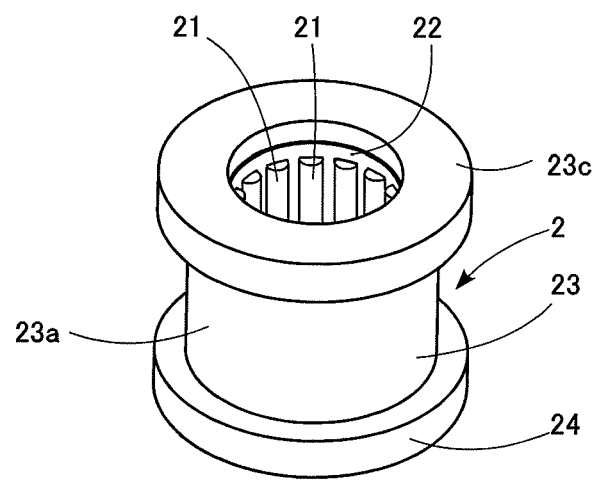
FIG. 9 illustrates a perspective view of the roller used in the third embodiment of this invention.
Figure 10:
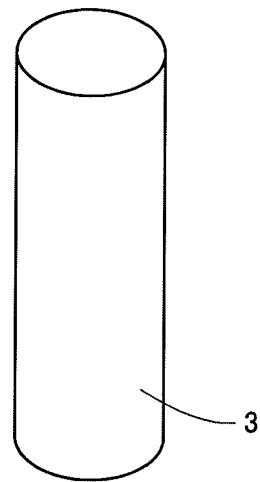
FIG. 10 illustrates a perspective view of the support shaft for supporting the roller utilized in the third embodiment of this invention.

Next, the third embodiment according to this invention will be described with reference to FIGS. 8 to 10. FIG. 8 illustrates a cross-sectional view of the third embodiment of this invention. FIG. 9 illustrates a perspective view of the roller used in the third embodiment of this invention. FIG. 10 shows a perspective view of the support shaft for supporting the roller utilized in the third embodiment of this invention. In this embodiment, elements that are common with the elements in the aforementioned first and second embodiments will be identified with the same reference numerals and their explanations will be omitted, while the discussion will focus on the differences.

As described above, the rollers 2 abutting the timing chain 40 are supported by the shafts 3 attached to the side plates 14, 14. The rollers 2 are supported via the rolling-element bearings by the shafts 3.

As illustrated in FIGS. 8 and 9, the roller 2 comprises the outer ring main body 20 and the resin-made annular member 23 mounted on the outer circumferential face of the outer ring main body 20. The column-shaped shaft 3 as shown in FIG. 10 is inserted into the roller 2 to be attached thereto.

As shown in FIG. 8, the shaft 3 to be mounted to the side plates 14 penetrates the cylindrical outer ring main body 20 to be attached to the roller 2. The outer ring main body 20 is formed so as to encompass the outer circumferential face of the shaft 3. The plurality of the rolling elements 21 are disposed between the outer circumferential face of the shaft 3 and the inner circumferential face of the outer ring main body 20. The rolling elements 21 roll along the outer circumferential face of the shaft 3 and the inner circumferential face of the outer ring main body 20. The rolling elements 21 are held at predetermined intervals in the circumferential direction by the cage 22. The shaft 3, the outer ring main body 20 and the rolling elements 21 constitute a rolling-element bearing (a needle roller bearing). Use of the cage 22 serves to prevent skew of the rolling elements 21 as well as hinder the end faces of the rolling elements 21 from making direct contact with the side plates 14 to thereby hamper the wearing away of the side plates 14.

In this third embodiment, the outer ring main body 20 may be formed by pressing a thin plate to constitute a drawn cup roller bearing. Using the drawn cup roller bearing is conducive to reduction in cost and weight.

As described above, the annular member 23 fixed to the outer circumferential face of the outer ring main body 20 is made of resin and includes the pair of the outwardly protruding flanges 24 at the both ends in the direction of the shaft 3. It is noted that the annular member 23 without the flanges 24 may be employed.

The timing chain 40 abuts the outer circumferential face of the annular member 23 inside the flanges 24. The protruding height of the flanges 24 is smaller than the height of the cross section of the timing chain 40. For example, the annular member 23 and the flanges 24 are integrally molded with resin using polyamide (PA) 46 and polyamide (PA) 66 that are polymers by polycondensation of diaminobutane and adipic acid. In order to increase mechanical strength, PA 46 and PA 66 reinforced with long fiberglass can also be used.

In this third embodiment, the bearing constituted of the outer ring main body 20, the rolling elements 21 and the cage 22 is inserted and the annular member 23 is molded with resin to thereby form the roller 2.

It is noted that the roller 2 can also be formed by press fitting instead of insert molding. For instance, the cylindrical annular member 23 having an inner diameter dimensioned to allow the outer ring main body 20 to be press-fitted therein and the flanges 24 are molded with resin in advance, and the outer ring main body 20 is fixed by press fitting into the annular member 23, thereby forming the roller 2.

As described above, the roller 2 with the shaft 3 attached thereto is prepared. The roller 2 is then supported and fixed to the chain guide base 10 to constitute the chain guide 1.

In addition, in this embodiment, the length of the resin-made annular member 23 is made longer than the length of the outer ring main body 20 as shown in FIG. 8. The length of the annular member 23 thus made longer than that of the outer ring main body 20 ensures to avoid direct contact of the outer ring main body 20 with the side plates 14.

Figure 11:
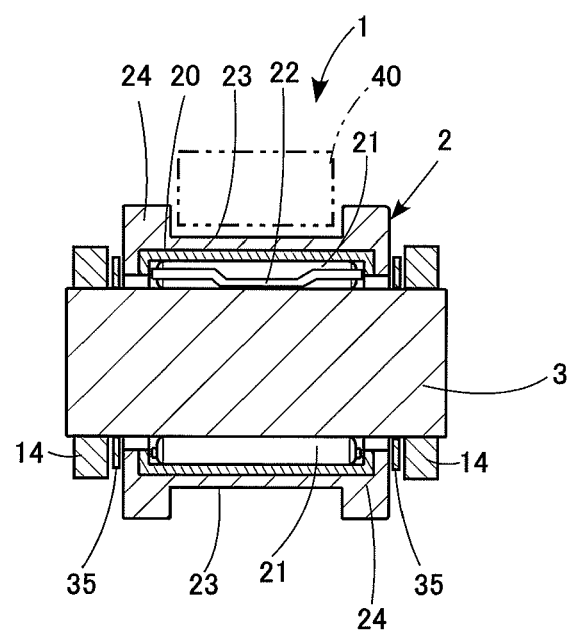
FIG. 11 illustrates a cross-sectional view of the chain guide according to the fourth embodiment of this invention.

Next, the fourth embodiment according to the present invention will be described with reference to FIG. 11. FIG. 11 shows a cross-sectional view of the fourth embodiment according to this invention. In this embodiment, elements that are common with the elements in the aforementioned first to third embodiments will be identified with the same reference numerals and their explanations will be omitted, while the discussion will focus on the differences.

In the fourth embodiment, washers 35 are mounted on the shaft 3 so as to be disposed between the roller 2 and the respective side plates 14, and the shaft 3 is inserted into the side plates 14 to be fixedly secured thereto.

The washers 35 thus interposed between the roller 2 and the side plates 14 prevent the roller 2 from making direct contact with the respective side plates 14, thereby improving wear resistance of the roller 2 and the side plates 14.

Figure 12:
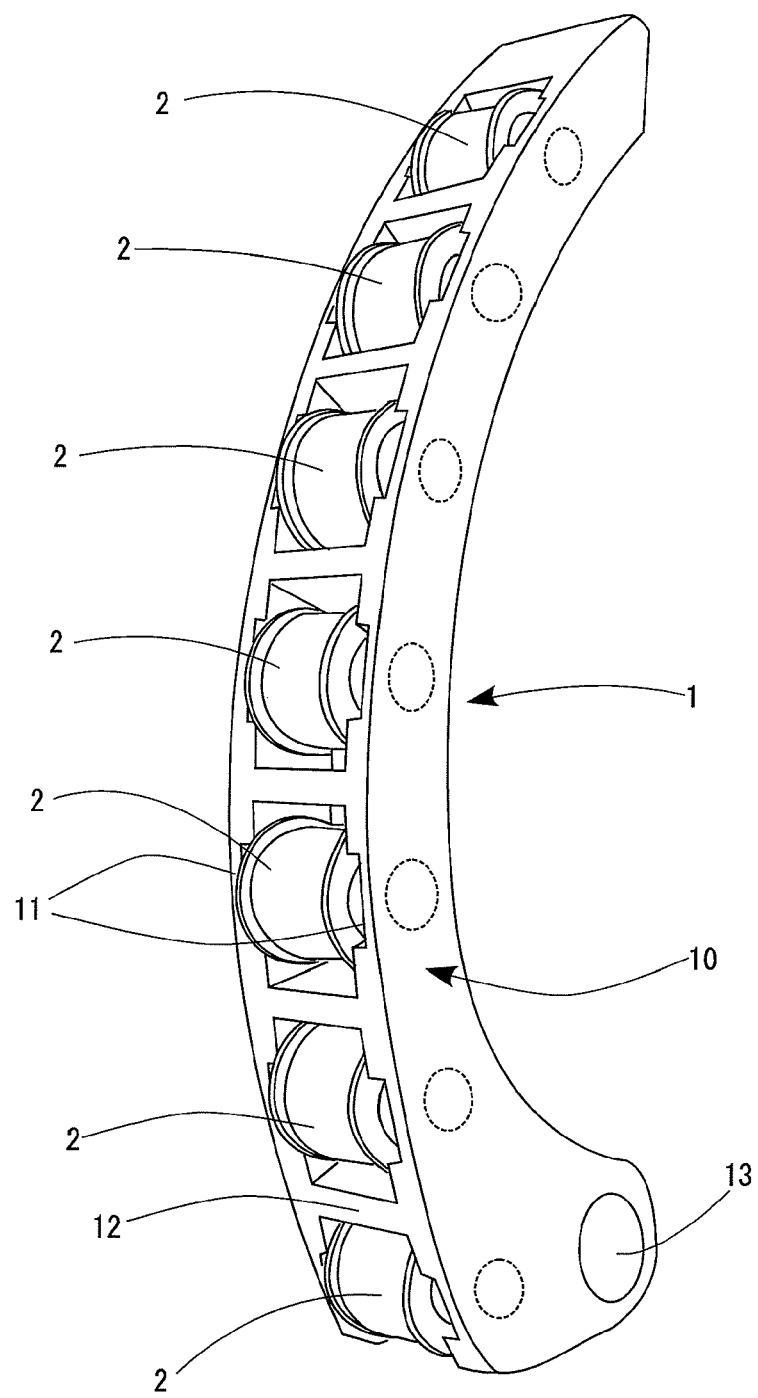
FIG. 12 illustrates a perspective view of the chain guide according to the fifth embodiment of this invention.
Figure 13:
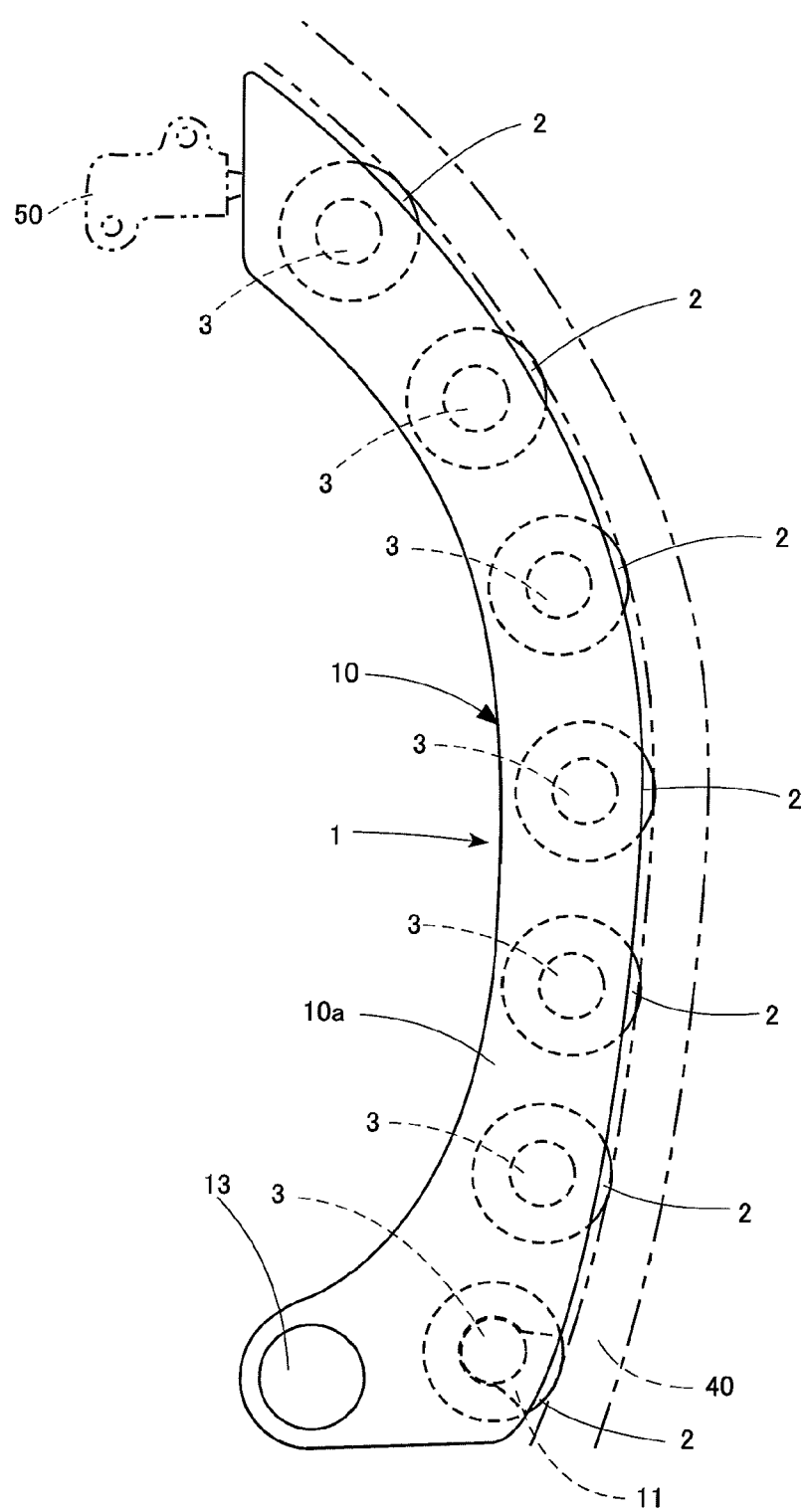
FIG. 13 illustrates a side view of the chain guide according to the fifth embodiment of this invention.
Figure 14:
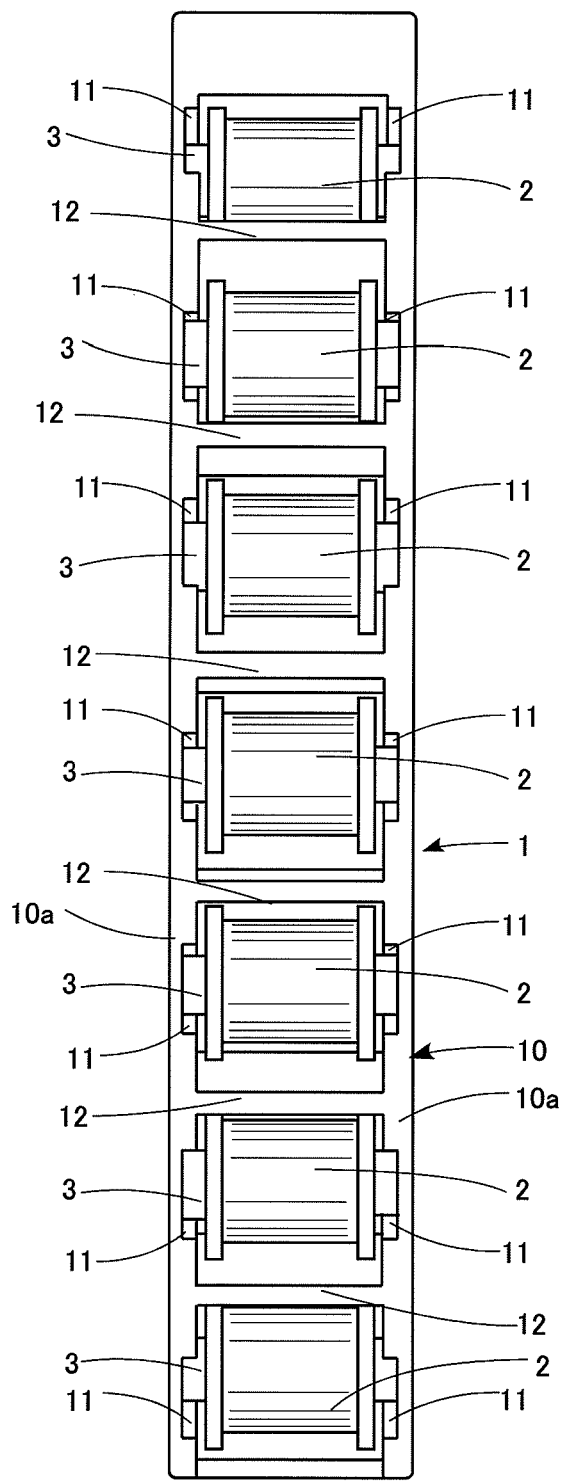
FIG. 14 illustrates a front view of the chain guide according to the fifth embodiment of this invention.
Figure 15:
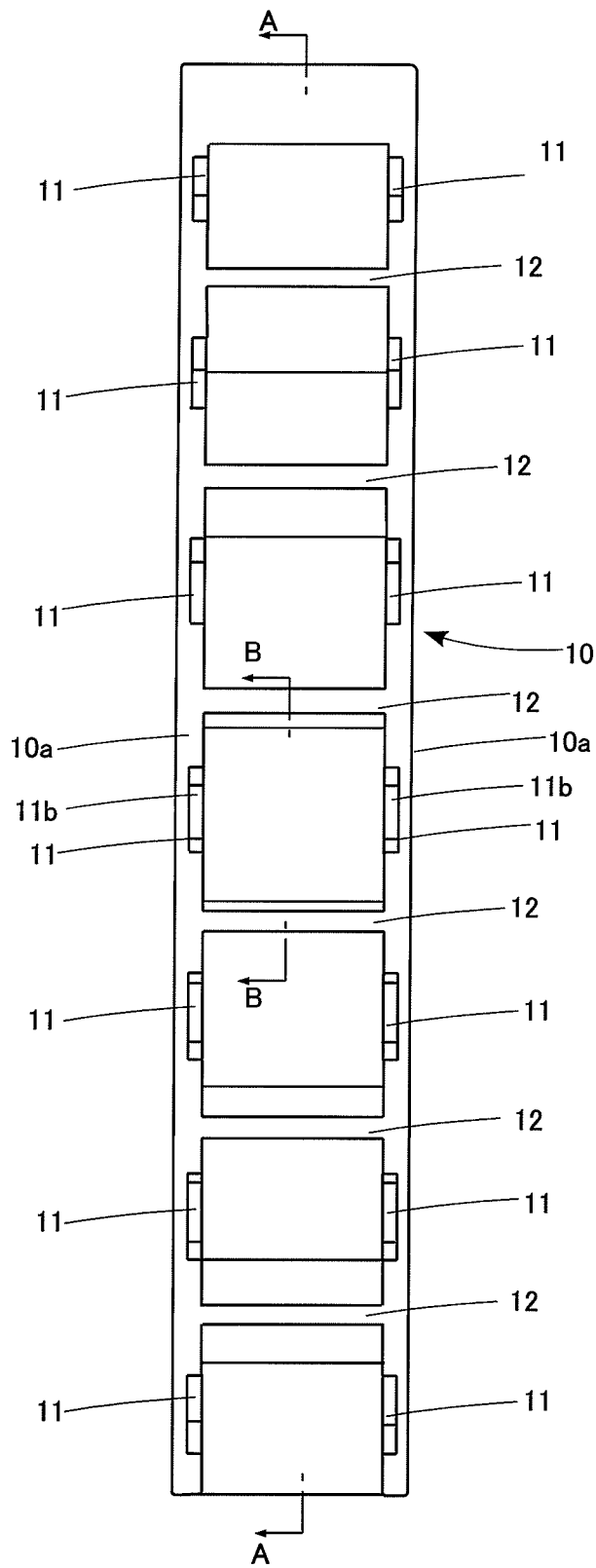
FIG. 15 illustrates a front view of the chain guide base employed for the chain guide according to the fifth embodiment of this invention.
Figure 16:
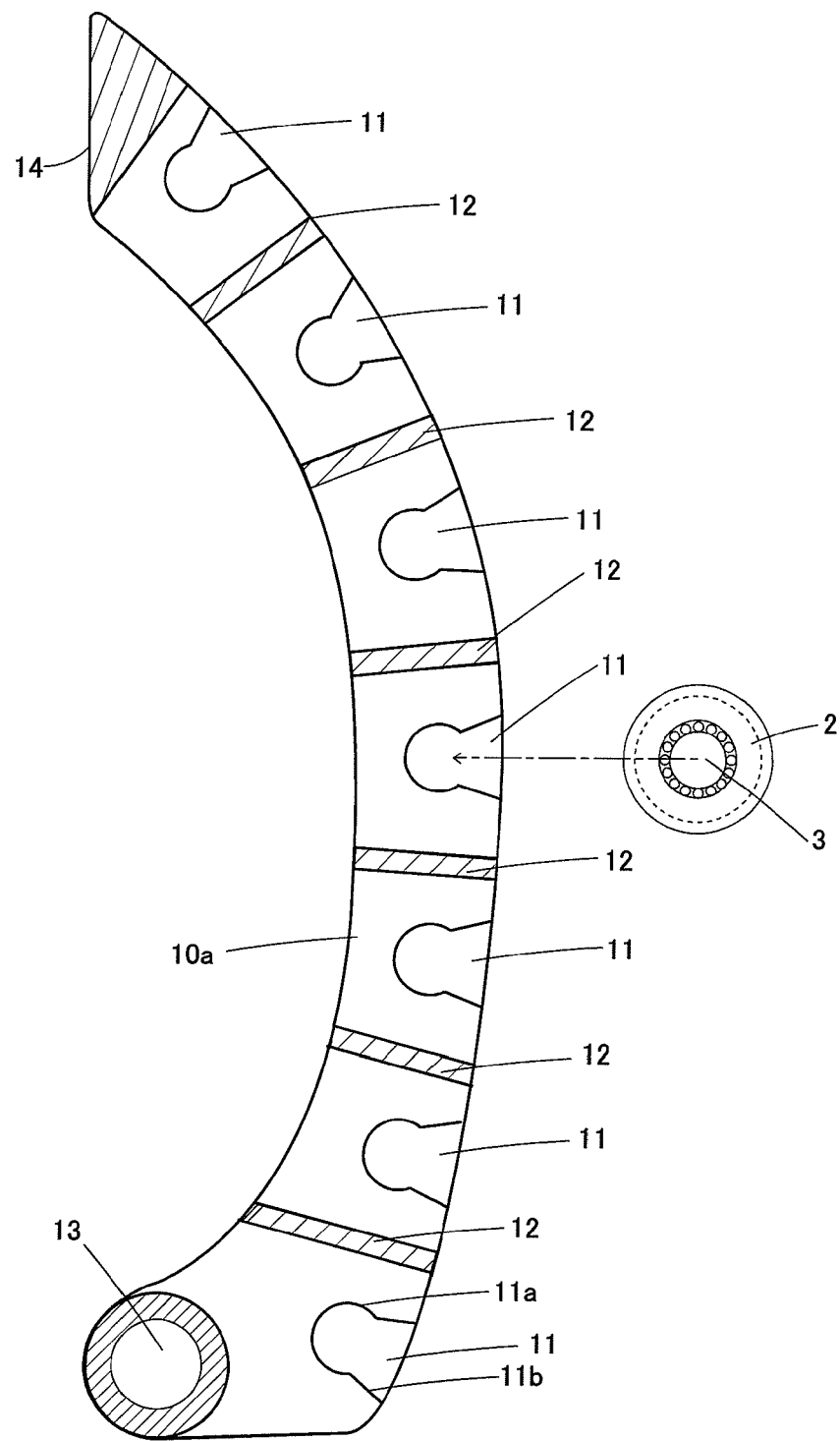
FIG. 16 illustrates an explanatory diagram of the chain guide base cut along the A-A line of FIG. 15.
Figure 17:
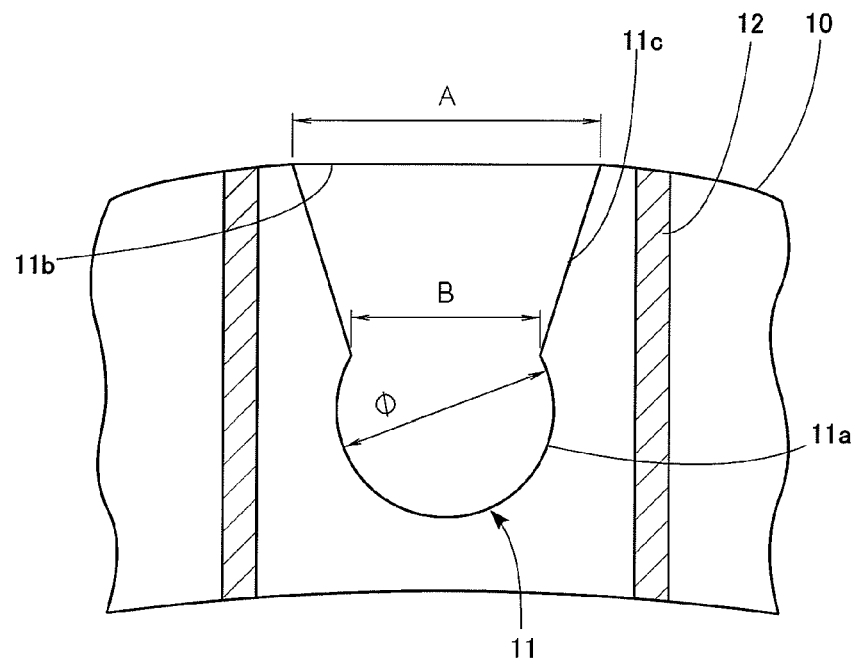
FIG. 17 illustrates an enlarged sectional view cut along the B-B line of FIG. 15.
Figure 18:
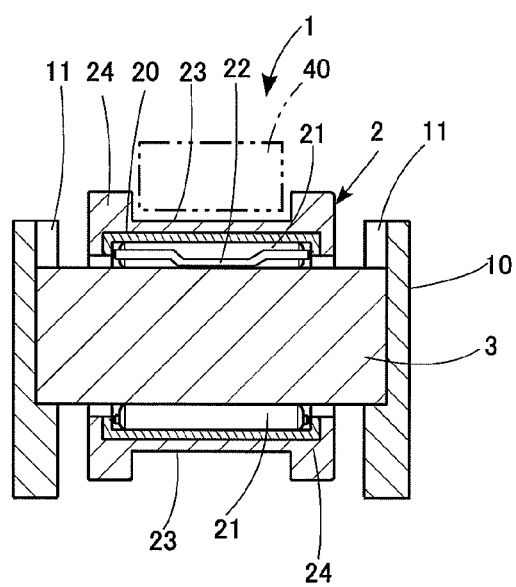
FIG. 18 illustrates a cross-sectional view of the chain guide according to the fifth embodiment of this invention.

Next, the fifth embodiment of the present invention will be described, referring to FIGS. 12 to 18. FIG. 12, FIG. 13 and FIG. 14 illustrate a perspective view, a side view and a front view, of the chain guide according to the fifth embodiment of this invention, respectively. FIG. 15 illustrates a front view of the chain guide base employed in the chain guide according to the fifth embodiment of this invention. FIG. 16 illustrates an explanatory diagram of the chain guide base cut along the A-A line of FIG. 15. FIG. 17 illustrates an enlarged sectional view cut along the B-B line of FIG. 15. FIG. 18 illustrates a cross-sectional view of the chain guide according to the fifth embodiment of this invention. The fifth embodiment provides a further lightweight and inexpensive chain guide allowing a more reduced number of components and further improved assembling efficiency, as compared with the aforementioned embodiments.

The chain guide 1 according to the fifth embodiment is formed in a curved shape so as to be along the direction of travel of the chain, as shown in FIGS. 12 through 14. The convex curved side (the outside) of the chain guide 1 is disposed along the timing chain 40 shown in virtual lines in FIG. 13. The chain guide 1 includes the chain guide base 10 which is formed in a curved shape so as to extend along the timing chain 40. The chain guide base 10 comprises a pair of side plates 10a, 10a of a curved shape and pillar members 12 connecting the side plates 10a, 10a.

The chain guide base 10 further includes the through hole 13 at one end of the longitudinal direction thereof. The chain guide 10 is mounted for example to an inner wall of an engine cover by an axle (not shown) inserted through the through hole 13.

The chain guide 1 is free to swing toward the timing chain 40 at the other end of the longitudinal direction thereof, using the through hole 13 as the base end.

The chain tensioner 50 is disposed on that free end side of the chain guide 1. By way of one example, the chain tensioner 50 has a plunger reciprocating in the direction of swing of the chain guide 1 and is attached to the inner wall of the engine cover. The tip of the plunger abuts the inside curve edge 14 of the chain guide 1 to bias the chain guide 1 toward the timing chain 40. Needless to say, the chain tensioner 50 may be one comprising an adjuster mechanism capable of adjusting a pressing force on the chain guide 1 and be of hydraulic type capable of controlling the pressing force on the chain guide 1. The chain tensioner 50 and the chain guide 1 constitute the chain tensioner device.

As described above, the chain guide base 10 has the pair of the side plates 10a, 10a mutually connected by the plate-like pillar members 12. The pair of the side plates 10a, 10a has a predetermined spacing therebetween in the width direction of the chain guide 1. The plurality of the rollers 2 making contact with the timing chain 40 are disposed between the pair of the side plates 10a, 10a.

The opposing wall surfaces of the side plates 10a are provided with a plurality of support-shaft receiving recesses 11 into which the support shafts 3 supporting the rollers 2 are inserted. As shown in FIG. 17, the recess 11 is composed of a circular arc-shaped portion 11a, which is in the form of a partly cut-away circle and engaged with the shaft 3, an opening portion 11b provided at the edge of the timing-chain facing side of the side plate 10a, and an insert portion 11c connecting the opening portion 11b to the circular arc-shaped portion 11a.

As shown in FIGS. 14, 15 and 16, the recesses 11 are disposed in such a manner that a plurality of the circular arc-shaped portions 11a are aligned along the curve of the side plates 10a on their opposing wall surfaces, so that the plurality of the rollers 2 are arranged along the direction of travel of the timing chain 40.

As shown in FIG. 17, the insert portion 11c of the recess 11 is of a tapered shape, which is wide at the opening portion 11b and gradually narrows down to reach the circular arc-shaped portion 11a. Specifically, the insert portion 11c is formed such that the length B at the position where the insert portion 11c connects with the circular arc-shaped portion 11a is made shorter than the length A at the opening portion 11b.

As shown in FIG. 15, the recesses 11 are formed on the side plates 10a, 10a of the chain guide base 10 in a manner that the opening portions 11b of the recesses 11 are exposed at the side, which confronts the timing chain 40, of the respective side plates 10a, 10a.

In the fifth embodiment, the diameter φ of the circular arc-shaped portion 11a is made smaller than the diameter of the shaft 3, and the length B at the position where the insert portion 11c connects with the circular arc-shaped portion 11a is set shorter than the diameter φ of the circular arc-shaped portion 11a. Furthermore, as shown in FIG. 15, the recess 11 is configured not to penetrate the side plates 10a. This non-penetrating structure serves to restrict movement of the inserted shaft 3 in the axial direction.

As shown in FIG. 15, the pillar member 12 formed of a plate-like member is provided between the respective adjacent recesses 11, 11 to connect the pair of the side plates 10a, 10a. In the fifth embodiment, for example, the chain guide base 10 including these side plates 10a, 10a and the pillar members 12 are integrally molded with resin using polyamide (PA) 46 and polyamide (PA) 66 that are polymers by polycondensation of diaminobutane and adipic acid. In order to increase mechanical strength, PA 46 and PA 66 reinforced with long fiberglass can also be used.

The chain guide base 10 thus made of resin serves to achieve weight reduction. Alternatively, the chain guide base 10 can be formed for example by casting using light metal, including aluminum, instead of resin.

The rollers 2 abutting the timing chain 40 are supported by the shafts 3 attached to the side plates 10a, 10a. The rollers 2 are supported via the rolling-element bearings by the shafts 3.

As shown in FIG. 18, the roller 2 comprises the outer ring main body 20 and the resin-made annular member 23 mounted on the outer circumferential face of the outer ring main body 20. The column-shaped shaft 3 is inserted into the roller 2 to be attached thereto. The roller 2 and the shaft 3 are formed in the same manner as those of FIGS. 9 and 10 as described above.

As illustrated in FIG. 18, the shaft 3 to be inserted into the recesses 11 of the side plates 10a penetrates the cylindrical outer ring main body 20 to be attached to the roller 2. The outer ring main body 20 is formed so as to encompass the outer circumferential face of the shaft 3. The plurality of the rolling elements 21 are disposed between the outer circumferential face of the shaft 3 and the inner circumferential face of the outer ring main body 20. The rolling elements 21 roll along the outer circumferential face of the shaft 3 and the inner circumferential face of the outer ring main body 20. The rolling elements 21 are held at predetermined intervals in the circumferential direction by the cage 22. The shaft 3, the outer ring main body 20 and the rolling elements 21 constitute a rolling-element bearing (a needle roller bearing). Use of the cage 22 serves to prevent skew of the rolling elements 21 as well as hinder the end faces of the rolling element 21 from making direct contact with the side plates 10a to thereby hamper the wearing away of the side plates 10a. The rolling-element bearing may be a full type roller bearing without the cage 22.

In this fifth embodiment, the outer ring main body 20 may be formed by pressing a thin plate to constitute a drawn cup roller bearing. Using the drawn cup roller bearing is conducive to reduction in cost and weight.

As described above, the annular member 23 fixed to the outer circumferential face of the outer ring main body 20 is made of resin and includes the pair of the outwardly protruding flanges 24 at the both ends in the direction of the shaft 3. It is noted that the annular member 23 without the flanges 24 may be employed.

The timing chain 40 abuts the outer circumferential face of the annular member 23 inside the flanges 24, 24. The protruding height of the flanges 24 is smaller than the height of the cross section of the timing chain 40. For example, the annular member 23 and the flanges 24 are integrally molded with resin using polyamide (PA) 46 and polyamide (PA) 66 that are polymers by polycondensation of diaminobutane and adipic acid. In order to increase mechanical strength, PA 46 and PA 66 reinforced with long fiberglass can also be used.

In this fifth embodiment, the bearing constituted of the outer ring main body 20, the rolling elements 21 and the cage 22 is inserted and the annular member 23 is molded with resin to thereby form the roller 2.

It is noted that the roller 2 can also be formed by press fitting instead of insert molding. For instance, the cylindrical annular member 23 having an inner diameter dimensioned to allow the outer ring main body 20 to be press-fitted therein and the flanges 24 are molded with resin in advance, and the outer ring main body 20 is then fixed by press fitting into the annular member 23, thereby forming the roller 2.

As described above, the roller 2 with the shaft 3 attached thereto is prepared. The roller 2 is then supported and fixed to the chain guide base 10 to constitute the chain guide 1. The side plates 10a of the chain guide base 10 are each provided with the recesses 11 having the opening portions 11b arranged at the side confronting the timing chain 40. The rollers 2 can be supported between the side plates 10a, 10a by forming the recesses 11 in this manner, bringing the shafts 3 attached to the rollers 2 to the opening portions 11b to be dropped therein, thereby inserting the shafts 3 into the recesses 11. In this embodiment, the opening portion 11b is wide and the insert portion 11c is tapered shaped, whereby the shaft 3 is readily guided from the opening portion 11b through the insert portion 11c into the circular-arc shaped portion 11a.

In the fifth embodiment, the diameter φ of the circular arc-shaped portion 11a is made smaller than the diameter of the shaft 3, so that the shaft 3 is press-fitted into the circular arc-shaped portion 11a to be fixed therein, which results in restraining rotation of the shaft 3. The length B at the position where the insert portion 11c connects with the circular arc-shaped portion 11a is set smaller than the diameter φ of the circular arc-shaped portion 11a, whereby the ends of the insert portion 11c serve to hinder the shaft 3 from coming off. Moreover, the recess 11 is formed in a manner not to penetrate the side plate 10a, which ensures that movement of the inserted shaft 3 in the axial direction is restricted.

In the fifth embodiment, the length of the resin-made annular member 23 is made longer than the length of the outer ring main body 20 as shown in FIG. 18. The length of the annular member 23 thus made longer than that of the outer ring main body 20 ensures to avoid direct contact of the outer ring main body 20 with the side plates 10a.

Next, operation of the chain guide according to the fifth embodiment will be described below.

As shown in FIG. 13, the chain guide base 10 receives a pressing force from the chain tensioner 50 disposed at the inside curve. Then, the chain guide 1 abuts the timing chain 40 with the through hole 13 provided at one end of its longitudinal direction as the support point and the other end of the longitudinal direction as the free end. The timing chain 40 is guided along the outside curve edge of the chain guide 1. The outer circumferential face of the resin-made annular member 23 of the roller 2 presses the lateral side of the timing chain 40 by making rolling contact therewith. As a result, tension is applied to the timing chain 40. The roller 2 is pressed onto the bottom of the recess 11 by the timing chain 40. Because the shaft 3 is inserted into the recess 11 from the side confronting the timing chain 40 to be fitted therein, the roller 2 and the shaft 3 are supported without coming off of the side plates 10a of the chain guide base 10.

Because the timing chain 40 slides on the resin-made annular member 23 of the roller 2, abutment between metallic components can be avoided, which achieves suppression of vibration and noise reduction.

The chain guide base 10 thus made of resin achieves weight reduction as compared with metallic ones.

Moreover, according to the fifth embodiment, the annular member 23 includes the pair of the flanges 24, 24 protruding in the outer diametrical direction at the both ends of the axial direction. Because the timing chain 40 makes contact with the annular member 23 inside the pair of the flanges 24, 24, the timing chain 40 is prevented from leaving the roller 2.

It is advantageous to make the roller 2 as wide as possible relative to the distance between the side plates 10a, 10a of the chain guide base 10 in light of surface pressure as well as prevention of slipping off of the chain. To achieve this, however, account should be taken of manufacturing tolerances. Preferable design is such that there is no clearance between the pair of the flanges 24, 24 and the pair of the side plates 10a, 10a in a case that the distance between the flanges 24, 24 and the distance between the side plates 10a, 10a are assumed to be the largest/smallest at their tolerance limits. The tolerances referred to here are the general tolerances as defined in Table 1 of Japanese Industrial Standards (JIS) B0405, where the intermediate tolerance level is described as generally desirable. Specifically, normal design in terms of functionality is such that the maximum clearance between the pair of the flanges 24, 24 of the annular member 23 and the pair of the side plates 10a, 10a will be the summation of their respective maximum tolerances in their corresponding intermediate tolerance levels shown in Table 1 of JIS B0405.

In contrast, in the fifth embodiment of this invention, the clearance between the pair of the side plates 10a, 10a of the chain guide base 10 and the roller 2 is further widened to supply lubricating oil from this clearance. For instance, in a case where the distance between the side plates 10a, 10a is 20 mm, the distance between the pair of the flanges 24, 24 and the distance between the side plates 10a, 10a are given a tolerance of ±0.2 mm, respectively; therefore, the maximum clearance between the pair of the flanges 24, 24 and the pair of the side plate 10a, 10a is 0.4 mm. In contrast, in this embodiment, the annular member 23 and the pair of the flanges 24, 24 are so configured to provide a clearance of 0.4 mm or more between the pair of the side plates 10a, 10a and the roller 2.

Figure 19:
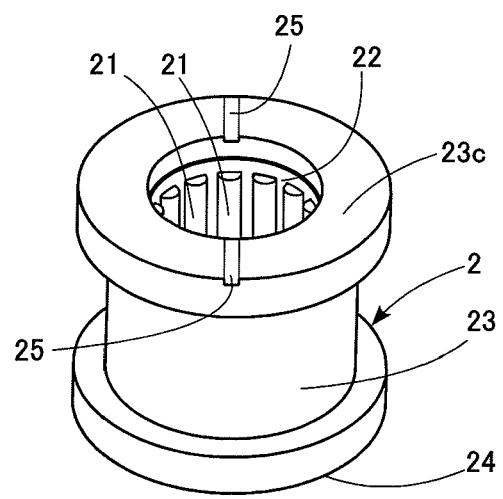
FIG. 19 illustrates a perspective view of a modification of the roller used in the chain guide according to the fifth embodiment of this invention.

Next, a modification of the fifth embodiment will be described. FIG. 19 illustrates a perspective view of this modification of the fifth embodiment. In the modification, elements that are common with the elements in the aforementioned fifth embodiment will be identified with the same reference numerals and their explanations will be omitted, while the discussion will focus on the differences. In this modification, lubrication grooves 25, 25 are formed on each side surface 23c of the resin-made annular member 23 mounted on the outer circumferential face of the outer ring main body 20, as shown in FIG. 19. These lubrication grooves 25, 25 ensure good lubrication condition between the side plates 10a of the chain guide base 10 and the annular member 23, conducive to reducing frictional resistance and improving wear resistance.

Figure 20:
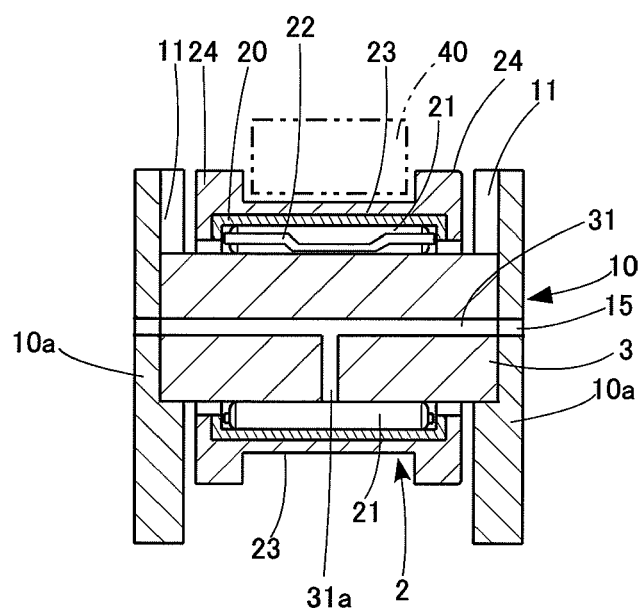
FIG. 20 illustrates a cross-sectional view of the chain guide according to the sixth embodiment of this invention.

Next, the sixth embodiment according to this invention will be described. FIG. 20 illustrates a cross-sectional view of the chain guide according to the sixth embodiment of this invention. In the sixth embodiment, elements that are common with the elements in the foregoing embodiments will be identified with the same reference numerals and their explanations will be omitted, while the discussion will focus on the differences. As shown in FIG. 20, in this embodiment, a lubrication hole 31 is provided at the central portion of the shaft 3, and an outlet hole 31a for supplying lubricating oil is provided at the opposite position from the timing chain 40. A hole 15 communicating with the lubrication hole 31 is formed on each side plate 10a. The lubrication hole 31 thus provided serves to supply lubricating oil inside the bearing as well as release heat. It is preferable to form the outlet hole 31a of the lubrication hole 31 on the opposite position from the timing chain 40 as described above, because this arrangement facilitates smooth supply of lubricating oil inside the bearing. Furthermore, the shaft 3 has a cavity due to the presence of the lubrication hole 31, which is conducive to weight reduction.

Figure 21:
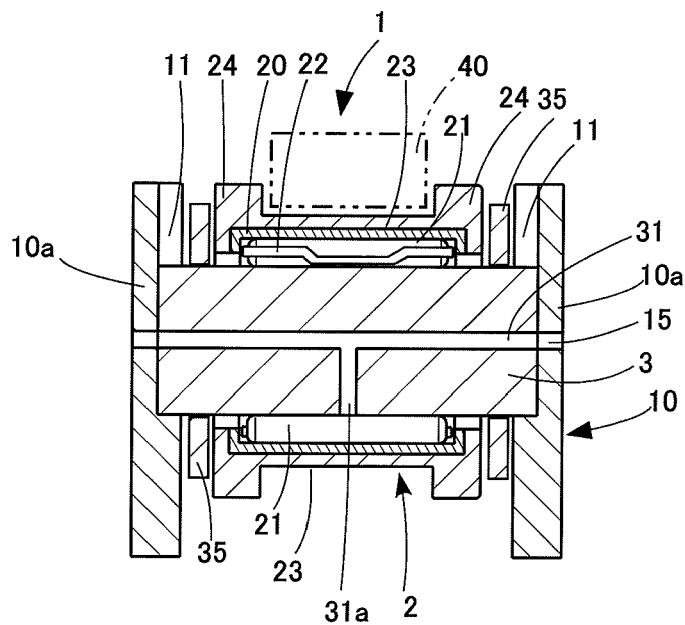
FIG. 21 illustrates a cross-sectional view of the chain guide according to the seventh embodiment of this invention.

Next, the seventh embodiment of this invention will be described. FIG. 21 illustrates a cross-sectional view of the chain guide according to the seventh embodiment of this invention. In the seventh embodiment, elements that are common with the elements in the foregoing embodiments will be identified with the same reference numerals and their explanations will be omitted, while the discussion will focus on the differences. In this embodiment, the washers 35 are mounted on the shaft 3 so as to be disposed between the roller 2 and the respective side plates 10a, and the shaft 3 is inserted into the recesses 11.

The washers 35 thus interposed between the roller 2 and the respective side plates 10a prevent the roller 2 from making direct contact with the side plates 10a, thereby improving wear resistance of the roller 2 and the side plates 10a.

In a case of molding the side plates 10a of the chain guide base 10 with resin as described above, the side plates 10a can be formed to have a height which is greater than the outer diameter of the annular member 23 made of resin. The side plates thus formed higher contributes to increasing strength. This is because resin is in a pulled state at the lower side than the recesses 11 (the opposite side from the chain) under tension applied by the chain, while resin is compressed at the upper side (the side facing the chain). Because the compressed side has greater strength than the pulled side in general, increased strength as a whole is achieved.

Figure 22:
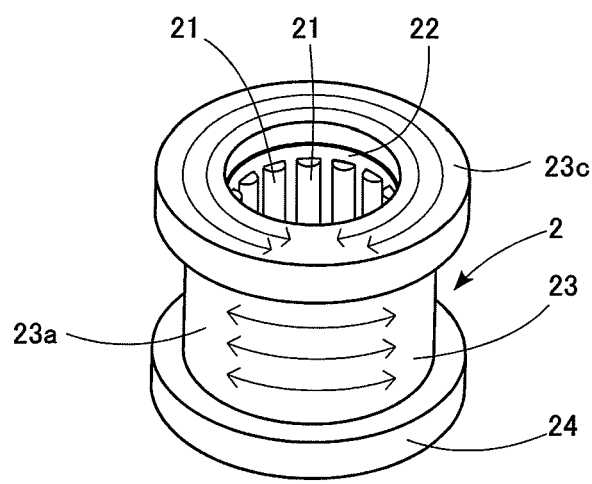
FIG. 22 illustrates a perspective view of the roller utilized in the chain guide according to the eighth embodiment of this invention.

Next, the eighth embodiment of this invention will be described with reference to FIG. 22. FIG. 22 illustrates a perspective view of the roller utilized in the eighth embodiment of this invention. In the eighth embodiment, elements that are common with the elements in the foregoing embodiments will be identified with the same reference numerals and their explanations will be omitted, while the discussion will focus on the differences. As described above, because the rollers disposed in the chain guide hold the timing chain with a large pressing force in the chain tensioner device, heavy load is applied on the rollers, so that they require sufficient strength. In particular, strength as well as weight reduction are requisites for automotive parts. Hence, the eighth embodiment ensures increased strength of the resin-made annular member 23 in contact with the timing chain 40.

In this eighth embodiment, molecular orientation of the annular member 23 is controlled so as to increase wear resistance and mechanical strength of the resin-made annular member 23 in contact with the timing chain 40. Specifically, as illustrated in FIG. 22, a contact surface 23a making contact with the timing chain 40 in the annular member 23 is molded with resin in a manner that the molecular orientation of resin on the contact surface 23a follows the moving direction of the timing chain 40 as indicated by arrows in the diagram. Consequently, the contact surface 23a of the annular member 23 is molded with its molecular orientation being along the circumferential direction of the roller 2.

The molecular orientation on the contact surface 23a of the annular member 23 is thus allowed to follow the moving direction of the timing chain 40. Accordingly, the timing chain 40 moves along the molecular orientation of resin, whereby wear resistance of resin is enhanced as well as mechanical strength is increased.

In addition, the surfaces 23c, which face the respective side plates 10a of the chain guide base 10, of the annular member 23 is molded with resin in a manner that molecular orientation of resin thereof follows the sliding direction of the roller 2, i.e., the rotational direction of the roller 2, as indicated by arrows in FIG. 22. The molecular orientation on the surfaces 23c facing the respective side plates 10a is thus allowed to follow the sliding direction of the roller 2, which contributes to enhancing wear resistance against the side plates 10a.

For example, resin materials for the annular member 23 include polyamide (PA) 46 and polyamide (PA) 66 that are polymers by polycondensation of diaminobutane and adipic acid. In order to increase mechanical strength, PA 46 and PA 66 reinforced with long fiberglass can also be used.

In this eighth embodiment, the bearing constituted of the outer ring main body 20, the rolling elements 21 and the cage 22 is inserted and the annular member 23 is molded with resin to thereby form the roller 2.

It is noted that the roller 2 can also be formed by press fitting instead of insert molding. For instance, the cylindrical annular member 23 having an inner diameter dimensioned to allow the outer ring main body 20 to be press-fitted therein and the flanges 24 are molded with resin in advance, and the outer ring main body 20 is then fixed by press fitting into the annular member 23, thereby forming the roller 2.

In the chain guide 1 according to the eighth embodiment, the timing chain 40 slides on the resin-made annular member 23 of the roller 2. Therefore, abutment between metallic components can be avoided, which achieves suppression of vibration and noise reduction. Moreover, in the eighth embodiment, the contact surface 23a, which makes contact with the timing chain 40, of the annular member 23 is molded with resin in a manner that the molecular orientation of resin on the contact surface 23a follows the moving direction of the timing chain 40. Because the molecular orientation on the contact surface 23a of the annular member 23 is thus allowed to follow the moving direction of the timing chain 40, the timing chain 40 moves along the molecular orientation of resin, whereby wear resistance of resin is enhanced as well as mechanical strength is increased.

Moreover, according to the eighth embodiment, the annular member 23 includes the pair of the flanges 24, 24 protruding in the outer diametrical direction at the both ends of the axial direction. Because the timing chain 40 makes contact with the annular member 23 inside the pair of the flanges 24, 24, the timing chain 40 is prevented from leaving the roller 2 of the rolling-element bearing.

The chain guide base 10 thus made of resin achieves weight reduction as compared with metallic ones.

Furthermore, because the molecular orientation of resin on the surfaces 23c facing the respective side plates 10a is allowed to follow the sliding direction of the roller 2, wear resistance against the side plates 10a, in a case of the roller 2 shifting in the axial direction and contacting with the side plates 10a, is enhanced.

It is also possible to use different resin materials in the annular member 23 of the roller 2 and the side plates 10a. For example, high-strength resin may be used for the side plates 10a, while resin superior in wear resistance may be utilized for the roller 2.

In the roller 2 of the aforementioned eighth embodiment, the resin-made annular member 23 is provided on the metallic outer ring main body 20. The shaft 3 of the roller 2 is supported on the recesses 11 in the side plates 10a made of resin. The metallic timing chain 40 then makes contact with the contact surface 23a of the resin-made annular member 23. Thus, contact among metal (the timing chain 40) and resin (the annular member 23), and among metal (the shaft 3) and resin (the side plates 10a), is achieved, which ensures absorbing vibration on respective contact surfaces among these components, thereby attaining vibration-absorbing structure.

Figure 23:
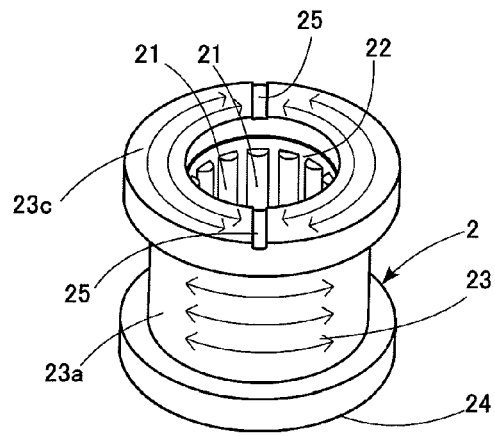
FIG. 23 illustrates a perspective view of a modification of the roller employed in the chain guide according to the eighth embodiment of this invention.

Next, a modification of the eighth embodiment will be described. FIG. 23 illustrates a perspective view of the modification of the eighth embodiment of this invention. In this modification, elements that are common with the elements in the foregoing embodiments will be identified with the same reference numerals and their explanations will be omitted, while the discussion will focus on the differences. In this modification, the lubrication grooves 25, 25 are formed on each side surface 23c of the resin-made annular member 23 mounted on the outer circumferential face of the outer ring main body 20, as shown in FIG. 23. These lubrication grooves 25, 25 ensure good lubrication condition between the side plates 10a of the chain guide base 10 and the annular member 23, conducive to reducing frictional resistance and improving wear resistance.

Also in this modification, the contact surface 23a of the annular member 23 is molded with resin in a manner that the molecular orientation of resin thereof follows the moving direction of the timing chain 40. Likewise, the surfaces 23c, which face the respective side plates 10a, of the roller 2 are molded with resin such that the molecular orientation of resin thereof follows the sliding direction of the roller 2.

Figure 24:
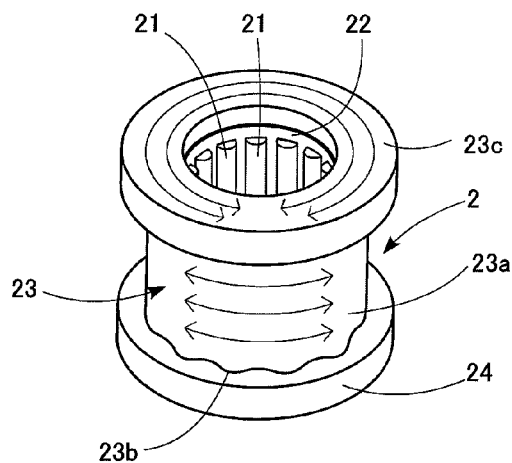
FIG. 24 illustrates a perspective view of the roller utilized in the chain guide according to the ninth embodiment of this invention.
Figure 25:
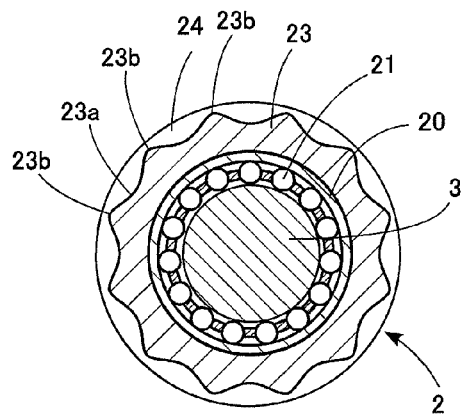
FIG. 25 illustrates a longitudinal sectional view of the chain guide according to the ninth embodiment of this invention.
Figure 26:
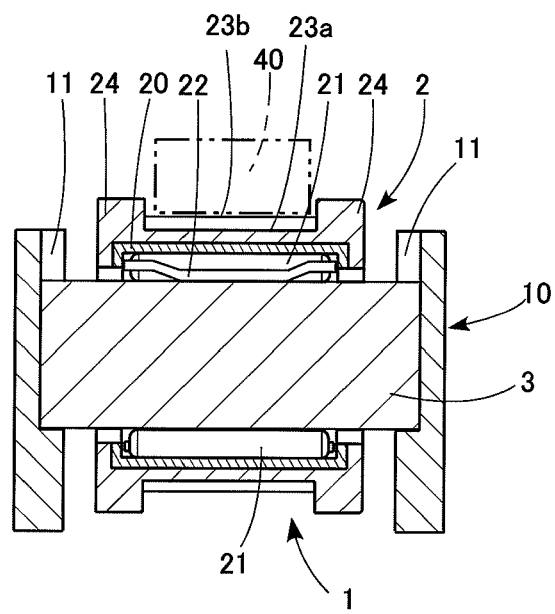
FIG. 26 illustrates a cross-sectional view of the chain guide according to the ninth embodiment of this invention.

Next, the ninth embodiment according to this invention will be described. FIG. 24 illustrates a perspective view of the roller utilized in the chain guide according to the ninth embodiment of this invention. FIG. 25 illustrates a longitudinal sectional view of the chain guide according to the ninth embodiment of this invention. FIG. 26 illustrates a cross-sectional view of the chain guide according to the ninth embodiment of this invention. In this embodiment, elements that are common with the elements in the foregoing embodiments will be identified with the same reference numerals and their explanations will be omitted, while the discussion will focus on the differences.

In this ninth embodiment, the annular member 23 of the roller 2 includes convex portions 23b formed at predetermined intervals on its outer circumferential contact surface 23a which makes contact with the timing chain 40. The convex portions 23b thus formed at predetermined intervals on the outer circumferential contact surface 23a of the roller 2 ensure that the timing chain 40 keeps contact with the roller 2 to thereby prevent the timing chain 40 from flopping around. Consequently, vibration and noise are suppressed. The outer circumference of the roller 2 may be shaped to mesh with the timing chain 40 like a sprocket.

Also in the ninth embodiment, the contact surface 23a, which makes contact with the timing chain 40, of the annular member 23 is molded with resin in a manner that the molecular orientation of resin on the contact surface 23a follows the moving direction of the timing chain 40. Because the molecular orientation on the contact surface 23a of the annular member 23 is thus allowed to follow the moving direction of the timing chain 40, the timing chain 40 moves along the molecular orientation of resin, whereby wear resistance of resin is enhanced as well as mechanical strength is increased.

Figure 27:
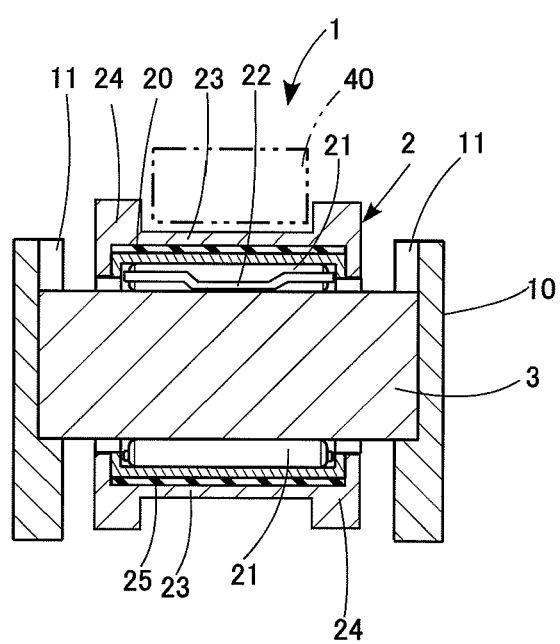
FIG. 27 illustrates a cross-sectional view of the chain guide according to the tenth embodiment of this invention.

Next, the tenth embodiment according to this invention will be described. FIG. 27 illustrates a cross-sectional view of the chain guide according to the tenth embodiment of this invention. In the tenth embodiment, elements that are common with the elements in the foregoing embodiments will be identified with the same reference numerals and their explanations will be omitted, while the discussion will focus on the differences.

In the tenth embodiment, a cylindrical vibration-absorbing member 25 made of rubber or the like, for example, is interposed between the outer ring main body 20 and the annular member 23.

The vibration-absorbing member 25 thus interposed contributes to suppressing vibration and noise.

Figure 28:
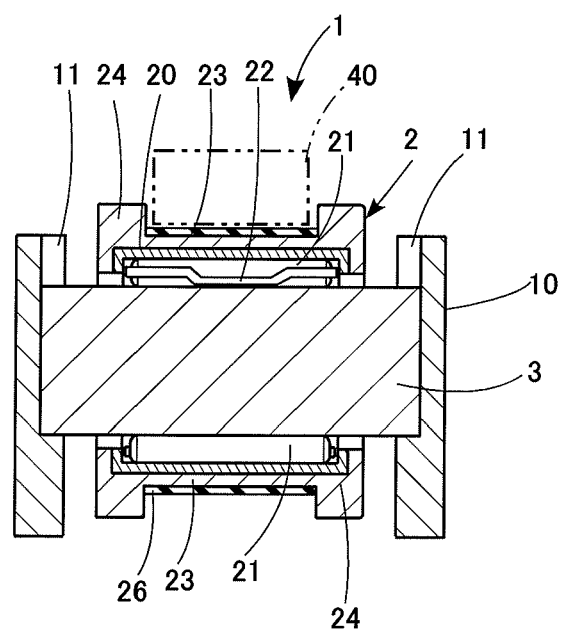
FIG. 28 illustrates a cross-sectional view of the chain guide according to the eleventh embodiment of this invention.

Next, the eleventh embodiment of this invention will be described. FIG. 28 illustrates a cross-sectional view of the chain guide according to the eleventh embodiment of this invention. In the eleventh embodiment, elements that are common with the elements in the foregoing embodiments will be identified with the same reference numerals and their explanations will be omitted, while the discussion will focus on the differences.

In the eleventh embodiment, a cylindrical vibration-absorbing member 26 made of rubber or the like is mounted on the outer circumferential face, which makes contact with the timing chain 40, of the annular member 23 in the roller 2. The vibration-absorbing member 26 thus mounted contributes to suppressing vibration and noise.

Figure 29:
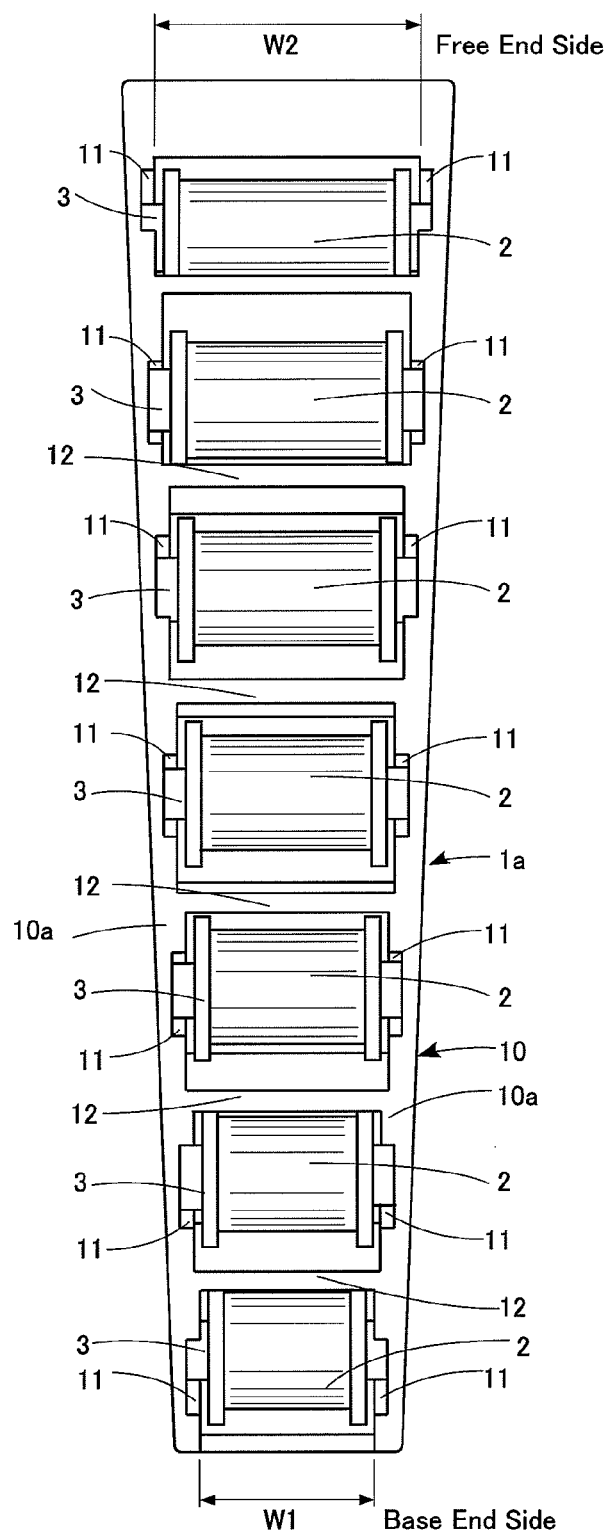
FIG. 29 illustrates a front view of the chain guide according to the twelfth embodiment of this invention.
Figure 30:
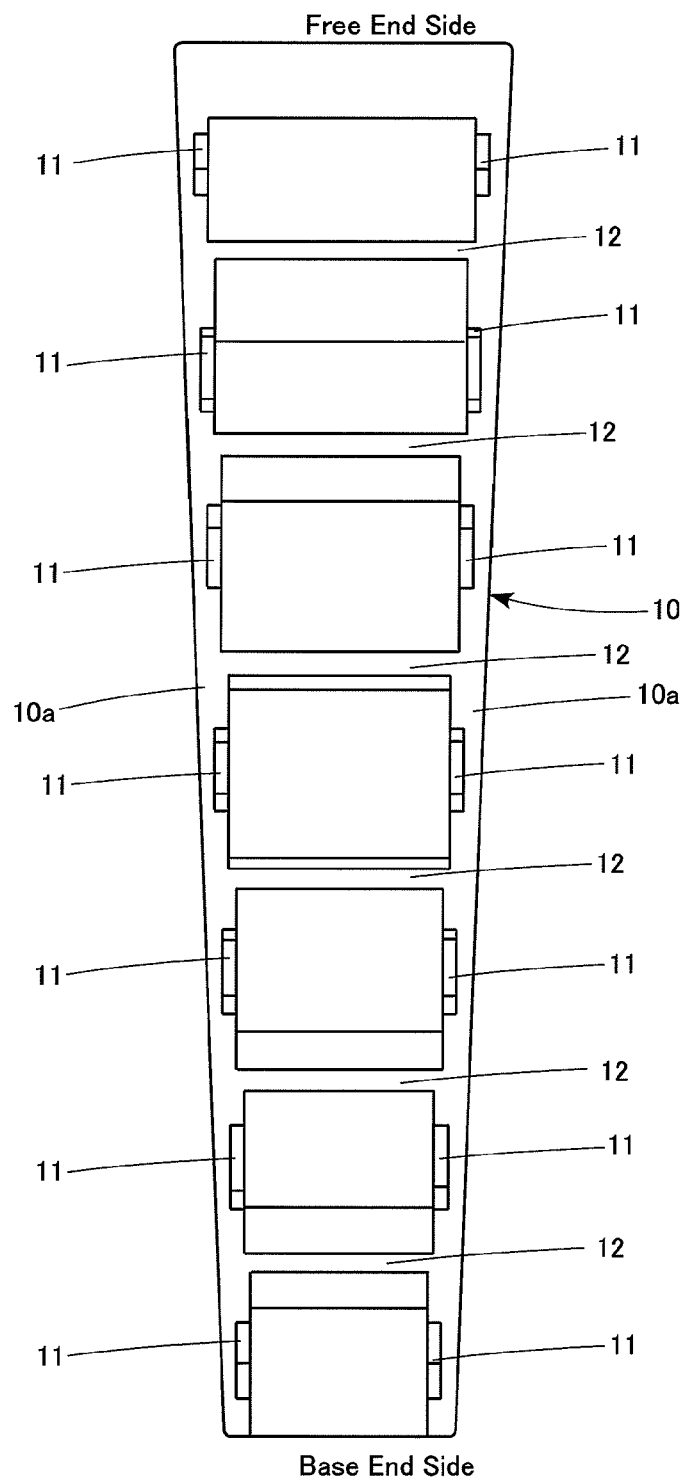
FIG. 30 illustrates a front view of the chain guide base used for the chain guide according to the twelfth embodiment of this invention.

Next, the twelfth embodiment of this invention will be described. FIG. 29 illustrates a front view of the chain guide according to the twelfth embodiment of this invention. FIG. 30 illustrates a front view of the chain guide base. In the twelfth embodiment, elements that are common with the elements in the foregoing embodiments will be identified with the same reference numerals and their explanations will be omitted, while the discussion will focus on the differences.

In the twelfth embodiment, the spacing between the side plates 10a, 10a of the chain guide base 10 increases gradually or stepwise from the base end side toward the free end side of the chain guide base 10. Similarly to the chain guide base 10, the lengths of the respective rollers supported on the chain guide base 10 also increase gradually or stepwise from the roller on the base end side toward the roller on the free end side of the chain guide base 10.

The chain guide 1 includes the through-hole on its base end side, through which the axle is inserted, so that the chain guide 1 is swingably fixed. The base end side of the chain guide 1 is thus in the vicinity of the fixed part and positioned on the drive sprocket side. Accordingly, the chain guide 1 is less likely to flop around on its base end side as compared with the free end side thereof. Therefore, the chain guide base 10 is configured such that the width $W_2$ on the free end side is larger, while the width $W_1$ on the base end side is smaller.

Conventionally, the width of the chain guide 1 in its entirety is set at the width required for its free end side, considering that the chain guide 1 may flop around. In the twelfth embodiment, in contrast, the width of the chain guide 1 is progressively narrowed down to be $W_2 > W_1$. The width of the chain guide 1 is not made larger than necessary in this manner, thereby achieving weight reduction in the chain guide 1.

Similarly to the chain guide base 10, the lengths of the resin-made rollers 2 are also increased gradually or stepwise from the roller on the base end side toward the roller on the free end side.

The chain guide 1 according to this embodiment can apply tension to a variety of drive chains, including a timing chain for an engine, as well as ensures reduction in mechanical loss.

The chain tensioner device of this invention comprises the chain guide 1 according to each of the aforementioned embodiments, which is swingably supported with the through-hole 13 used as the base end, and the chain tensioner 50 for pressing the chain guide 1 against the timing chain 40. In a case where this chain tensioner device is employed for the timing chain 40 of the engine, wear resistance is enhanced as well as weight reduction is achieved, conducive to improving the fuel consumption rate.

Figure 31:
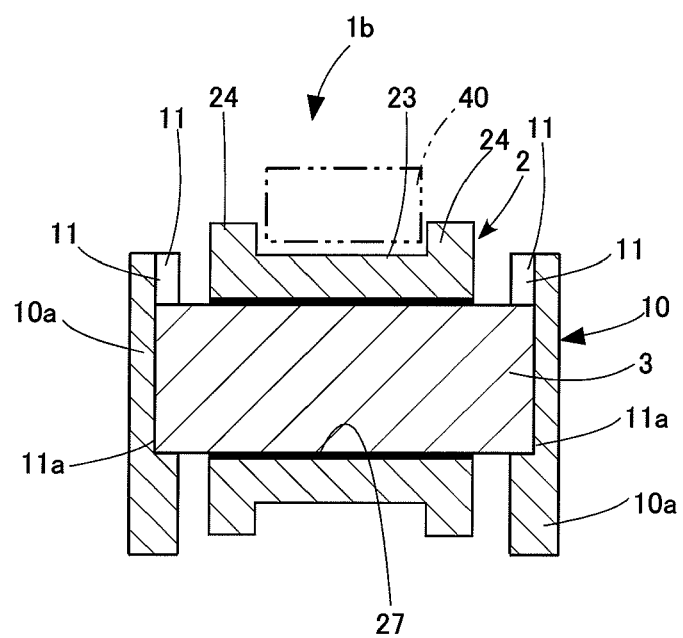
FIG. 31 illustrates a cross-sectional view of the chain guide according to the first reference example of this invention.

Next, the first reference example of this invention will be described. FIG. 31 illustrates a cross-sectional view of the chain guide according to the first reference example of this invention. In the first reference example, elements that are common with the elements in the foregoing embodiments will be identified with the same reference numerals and their explanations will be omitted, while the discussion will focus on the differences.

In the aforementioned embodiments, the roller 2 is supported on the chain guide base 10 via the rolling-element bearing. In this reference example as shown in FIG. 31, the roller 2 is supported on the chain guide base 10 via a sliding bearing. In this first reference example, the shaft 3 is slidably inserted into a shaft hole 27 of the resin-made annular member 23 constituting the roller 2. The annular member 23 made of resin and the shaft 3 constitutes the sliding bearing.

The shaft 3 inserted into the annular member 23 is press-fitted, through the opening portion 11b and the insert portion 11c, into the circular arc-shaped portion 11a of the recess 11 to be fixed therein. Also in this first reference example, the diameter φ of the circular arc-shaped portion 11a is made smaller than the diameter of the shaft 3, so that the shaft 3 is press-fitted into the circular arc-shaped portion 11a to be fixed therein, which results in restraining rotation of the shaft 3. The annular member 23 rotates with respect to the shaft 3 via the sliding bearing.

The roller 2 is pressed onto the bottom of the recess 11 (the circular arc-shaped portion 11a) by the timing chain 40. Because the shaft 3 is thus inserted into the recess 11 from the timing-chain facing side to be fitted therein, the roller 2 and the shaft 3 are supported without coming off of the side plates 10a of the chain guide base 10.

Also in this reference example, the contact surface of the annular member 23 is molded with resin in a manner that the molecular orientation of resin thereof follows the moving direction of the timing chain 40. Likewise, the surfaces, which face the respective side plates 10a, of the roller 2 are molded with resin in a manner that the molecular orientation of resin thereof follows the sliding direction of the roller 2.

As mentioned above, the annular member 23 according to each of the embodiments and the first reference example of this invention is made of resin, which ensures further suppression of vibration and noise when the metallic timing chain 40 makes contact with the annular member 23.

Figure 32:
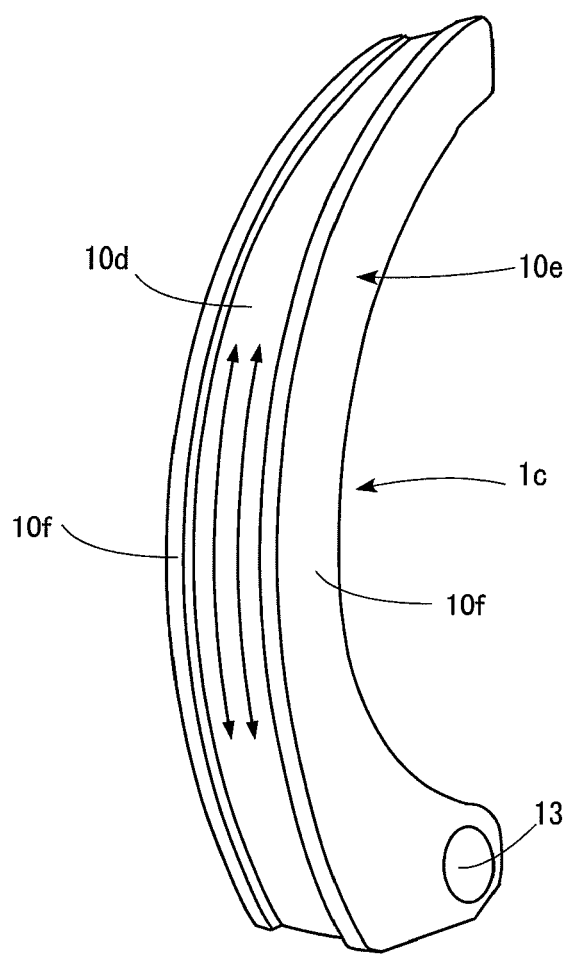
FIG. 32 illustrates a cross-sectional view of the chain guide according to the second reference example of this invention.
Figure 33:
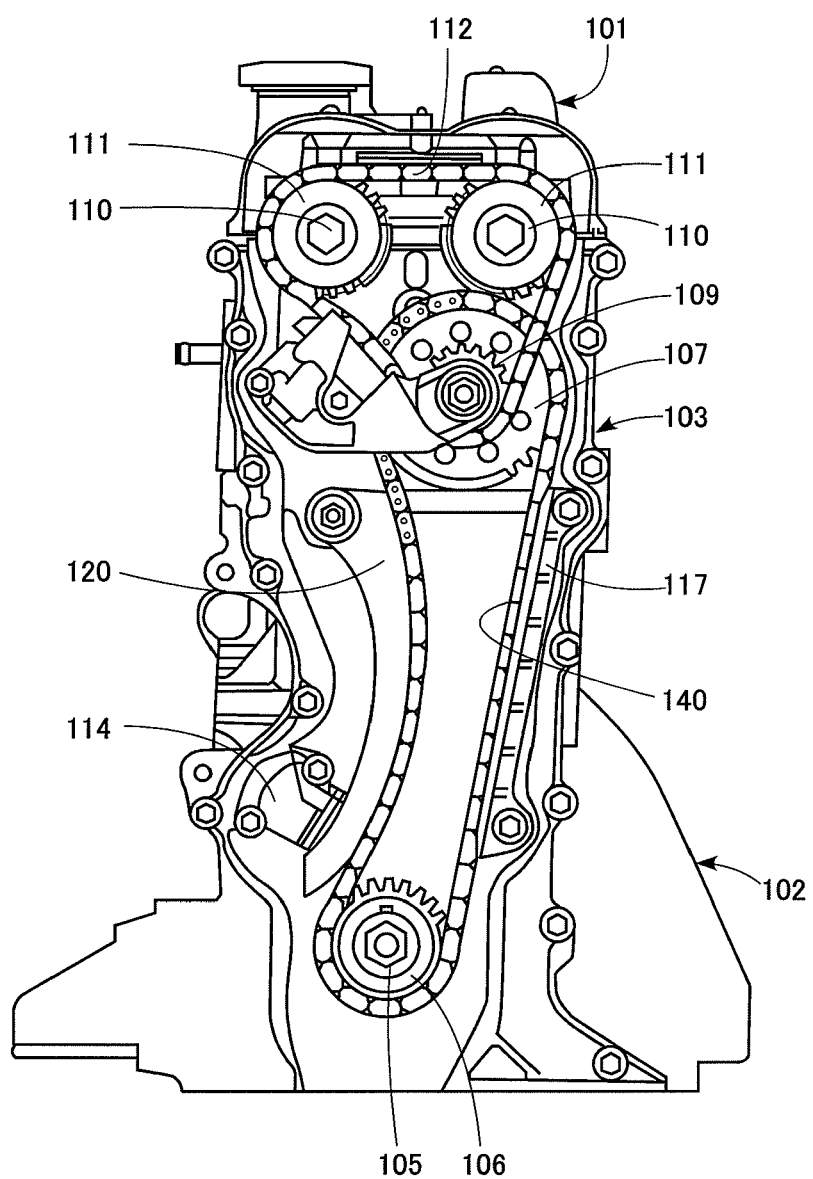
FIG. 33 illustrates a front view of the constitution of the valve operating system of the engine.

Next, the second reference example of this invention will be described. FIG. 32 illustrates a perspective view of the chain guide according to the second reference example of this invention. In the second reference example, elements that are common with the elements in the foregoing embodiments will be identified with the same reference numerals and their explanations will be omitted, while the discussion will focus on the differences.

In this second reference example as shown in FIG. 32, a plate-like contact body 10d formed of resin (a resin-made contact member), which makes contact with the timing chain 40, is mounted to side plates 10f, 10f of a chain guide 1c in place of the rollers 2.

In the second reference example, the contact surface, which makes contact with the timing chain 40, of the plate-like contact body 10d is molded with resin in a manner that molecular orientation of resin on the contact surface follows the moving direction of the timing chain 40. Because the molecular orientation on the contact surface of the plate-like contact body 10d is thus allowed to follow the moving direction of the timing chain 40, the timing chain 40 moves along the molecular orientation of resin, whereby wear resistance of resin is enhanced as well as mechanical strength is increased.

Also in this second reference example, the spacing between the side plates 10f, 10f of the chain guide base 10e may be increased gradually or stepwise from the base end side of the chain guide base 10e toward the free end side.

INDUSTRIAL APPLICABILITY

The chain guide according to this invention is effectively used in mechanisms for applying tension to a drive chain, including an engine.

The invention claimed is:
1. A chain guide comprising: a plurality of rollers which make contact with a metallic timing chain which drives intake and exhaust valves of an engine; a chain guide base which supports the plurality of the rollers disposed along a direction of travel of the chain; and a plurality of shafts attached to the chain guide base at predetermined intervals along the direction of travel of the chain,
each of the rollers including a rolling-element bearing portion constituted of a cylindrical outer ring main body encompassing an outer circumferential face of the shaft, and a plurality of rolling elements disposed between the outer circumferential face of the shaft and an inner circumferential face of the outer ring main body, the outer ring main body being supported on the chain guide base via the shaft so as to be in rolling contact with the timing chain without causing sliding friction, and
the chain guide base comprising a pair of side plates and pillar members connecting the side plates, the pair of the side plates being formed in a curved shape so as to be along the direction of travel of the chain, and the rollers being disposed between members of the side plates.
2. The chain guide according to claim 1, wherein a part, which makes rolling contact with the chain, of an outer circumference of the outer ring main body of the roller protrudes from between the members of the side plates toward the chain.
3. The chain guide according to claim 1, wherein the shafts are disposed along an edge portion, which faces the chain, of the chain guide base.
4. The chain guide according to claim 1, wherein an opposing wall surface of each of the side plates includes support-shaft receiving recesses for receiving the shafts of the rollers, each of the recesses having an opening portion at an edge, which faces the chain, of each of the side plates, and the shafts are inserted into the recesses of the side plates.
5. The chain guide according to claim 1, wherein the pair of the side plates and the pillar members are integrally molded with resin.
6. The chain guide according to claim 1, wherein the outer ring main body of the roller includes a metallic cylindrical body and an annular member coaxially mounted on an outer circumference of the cylindrical body, and an outer circumferential face of the annular member makes contact with the chain.
7. The chain guide according to claim 1, wherein a plurality of recesses are formed on an outer circumferential face of the outer ring main body of the roller.
8. The chain guide according to claim 1, wherein washers are interposed between the roller and the respective side plates.
9. The chain guide according to claim 4, wherein heights of the side plates are determined such that the rollers are accommodated inside the chain guide base.
10. The chain guide according to claim 4, wherein a width of the chain guide base on its chain leaving side is larger than a width on its chain entering side.
11. The chain guide according to claim 4, wherein each of the recesses in the side plate includes a circular arc-shaped portion, which is in form of a partly cut-away circle and engaged with the shaft, and an insert portion connecting the opening portion to the circular arc-shaped portion in the side plate.
12. The chain guide according to claim 11, wherein at least the circular arc-shaped portion of the recess is formed so as not to penetrate the opposing wall surface of the side plate.
13. The chain guide according to claim 11, wherein a diameter of the circular arc-shaped portion is made smaller than a diameter of the shaft, and the shaft is press-fitted into the circular arc-shaped portion to be fixed therein.
14. The chain guide according to claim 11, wherein a width of an inlet portion where the insert portion of the recess connects with the circular arc-shaped portion is set smaller than the diameter of the circular arc-shaped portion.
15. The chain guide according to claim 6, wherein lubrication holes are provided for wall surfaces of the side plates of the chain guide base and the shaft, respectively, in a manner to penetrate the wall surfaces of the side plates and the shaft to thereby lubricate the bearing portion from outer surfaces of the side plates.
16. The chain guide according to claim 15, wherein a lubricating oil supply portion of the lubrication holes for supplying lubricating oil to the bearing portion is provided at an opposite position from a side, which makes contact with the chain, of the bearing portion.
17. The chain guide according to claim 6, wherein the annular member has a pair of flanges protruding in a direction of an outer diameter at its both ends of an axial direction, and the annular member makes rolling contact with the chain inside the pair of the flanges.

18. The chain guide according to claim 17, wherein a protrusion height of the flanges is smaller than a height of a cross section of the chain.

19. The chain guide according to claim 6, wherein lubrication grooves are provided on side surfaces of the annular member.

20. The chain guide according to claim 6, wherein the annular member is formed of resin, and molecular orientation of resin of the outer circumferential face, which makes contact with the chain, of the annular member follows a moving direction of the chain.

21. The chain guide according to claim 6, wherein molecular orientation of resin on surfaces, which face the chain guide base, of the annular member follows a sliding direction.

22. The chain guide according to claim 6, wherein the chain guide base is formed of resin, and a resin material for the annular member differs from a resin material for the chain guide base.

23. The chain guide according to claim 6, wherein the annular member includes convex portions formed at predetermined intervals on its outer circumferential face making contact with the chain.

24. The chain guide according to claim 6, wherein a vibration-absorbing member is interposed between the metallic cylindrical body and the annular member.

25. The chain guide according to claim 6, wherein a vibration-absorbing member is mounted on the outer circumferential face of the annular member.

26. A chain tensioner device comprising the swingably supported chain guide according to claim 1, and a chain tensioner for pressing the chain guide against the drive chain.

* * * * *